United States Patent
Frtunikj et al.

(10) Patent No.: US 12,351,197 B2
(45) Date of Patent: Jul. 8, 2025

(54) SYSTEM, METHOD, AND COMPUTER PROGRAM PRODUCT FOR DATA-DRIVEN OPTIMIZATION OF ONBOARD DATA COLLECTION

(71) Applicant: FORD GLOBAL TECHNOLOGIES, LLC, Dearborn, MI (US)

(72) Inventors: Jelena Frtunikj, Munich (DE); Jan Martin, Munich (DE); Thomas Mühlenstädt, Munich (DE)

(73) Assignee: Ford Global Technologies, LLC, Dearborn, MI (US)

(*) Notice: Subject to any disclaimer, the term of this patent is extended or adjusted under 35 U.S.C. 154(b) by 210 days.

(21) Appl. No.: 18/153,543

(22) Filed: Jan. 12, 2023

(65) Prior Publication Data

US 2024/0239359 A1    Jul. 18, 2024

(51) Int. Cl.
*B60W 50/06*    (2006.01)
*B60W 60/00*    (2020.01)
*G01C 21/30*    (2006.01)
*G08G 1/00*     (2006.01)

(52) U.S. Cl.
CPC .......... *B60W 50/06* (2013.01); *B60W 60/001* (2020.02); *G01C 21/30* (2013.01); *G08G 1/22* (2013.01); *B60W 2555/20* (2020.02)

(58) Field of Classification Search
CPC ............... B60W 50/06; B60W 60/001; B60W 2555/20; G01C 21/30; G08G 1/22; G08G 1/0112; G06F 11/3476; G06F 17/40; G06V 20/56; G07C 5/08; H04N 23/64
See application file for complete search history.

(56) References Cited

U.S. PATENT DOCUMENTS

| | | | |
|---|---|---|---|
| 9,774,816 B2 | 9/2017 | Rios et al. | |
| 2014/0121958 A1 | 5/2014 | Schenken et al. | |
| 2018/0007323 A1 | 1/2018 | Botusescu et al. | |
| 2019/0172349 A1* | 6/2019 | Vora | G01S 17/89 |
| 2020/0400441 A1* | 12/2020 | Efland | G01C 21/387 |
| 2023/0020935 A1* | 1/2023 | Liu | H04W 4/44 |
| 2023/0205753 A1* | 6/2023 | Laska | G06F 16/29 |
| 2024/0257536 A1* | 8/2024 | Ferroni | G06V 20/70 |

* cited by examiner

*Primary Examiner* — Abby Y Lin
*Assistant Examiner* — Dylan M Katz
(74) *Attorney, Agent, or Firm* — Frank A. MacKenzie; Brooks Kushman, P.C.

(57) ABSTRACT

Provided are systems, methods, and computer program products for data-driven optimization of onboard data collection, comprising identifying a condition in a roadway associated with an operation of autonomous vehicles (AVs) that may be further optimized to improve performance of one or more AVs; and generating condition capture instructions to communicate to the AVs, wherein the condition capture instructions comprise one or more parameters of a storage request in one or more roadways predicted to exhibit the condition in the roadway; and when at least one instruction in the one or more condition capture instructions is received by an AV, the at least one instruction is configured to cause the AV to collect condition information in the roadway at a time when the condition is predicted to be present in the roadway.

18 Claims, 9 Drawing Sheets

400

| segment_guid | city | latitude | longitude | sum_n_school_vehicle_with_active_stop_signals | count_traversals | sum_trav_traversed_distance_m | sum_trav_time_min | objects_per_100k_m | objects_label_class | objects_per_100k_m_ucb | objects_per_100k_m_lcb |
|---|---|---|---|---|---|---|---|---|---|---|---|
| 1a0d7575-4094-4e3-b11c-9e4cab694bf | Miami | 25.804017 | -80.193966 | 3.0 | 742 | 2071.768909 | 6.105580 | 144.80 | school_vehicle_with_active_stop_signals | 386.451506 | 29.862024 |
| 707fcf88-0779-44ee-b602-4b43c0feaf0d | Miami | 25.786123 | -80.141127 | 14.0 | 5362 | 9660.505036 | 80.206601 | 144.92 | school_vehicle_with_active_stop_signals | 236.645422 | 79.229090 |
| 6f53648-d808-49fd-8e93-4917b67444a69 | Miami | 25.776614 | -80.135012 | 1.0 | 746 | 686.258310 | 1.437543 | 145.72 | school_vehicle_with_active_stop_signals | 681.114055 | 3.689253 |
| 4365bc32-3570-4256-8bc1-6951b9bb03e4 | Miami | 25.790872 | -80.131917 | 14.0 | 872 | 9594.353500 | 97.704350 | 145.92 | school_vehicle_with_active_stop_signals | 238.277054 | 79.775362 |
| 31ce1eab-edf3-4e20-b180-f9edbacd9f1f | Miami | 25.804395 | -80.199236 | 21.0 | 927 | 14320.085917 | 72.138463 | 146.65 | school_vehicle_with_active_stop_signals | 219.937073 | 90.776906 |
| d0a29847-ecab-4ae8-a36f-8e0687ea1c3e | Miami | 25.789924 | -80.141280 | 2.0 | 1285 | 1361.615632 | 2.839358 | 146.88 | school_vehicle_with_active_stop_signals | 471.223365 | 17.788374 |
| 0b455470-8fa8-4d0a-b218-5e9ee3e31004 | Miami | 25.773370 | -80.137137 | 1.0 | 894 | 679.858833 | 2.141047 | 147.09 | school_vehicle_with_active_stop_signals | 687.525348 | 3.723980 |
| 805e4311-e94b-4a05-89f7-759c32623ea1 | Miami | 25.803354 | -80.199148 | 14.0 | 2161 | 9326.460686 | 121.089457 | 150.11 | school_vehicle_with_active_stop_signals | 245.121313 | 82.066026 |
| d2e6f96-49cf-4ab3-9d09-611bbc8447e9a | Miami | 25.803649 | -80.199153 | 37.0 | 2192 | 24641.712855 | 738.904731 | 150.14 | school_vehicle_with_active_stop_signals | 204.611057 | 105.720794 |
| 9958b2bf-513c-4fa8-a456-8da55b8c08fe | Miami | 25.793934 | -80.142578 | 23.0 | 981 | 15243.539248 | 51.427673 | 150.88 | school_vehicle_with_active_stop_signals | 222.457022 | 95.647256 |

FIG. 4

SYSTEM, METHOD, AND COMPUTER PROGRAM PRODUCT FOR DATA-DRIVEN OPTIMIZATION OF ONBOARD DATA COLLECTION

FIELD

This disclosure relates generally to data-driven optimization of onboard data collection, and more specifically, to a system for identification, collection, logging, and storage of camera images, radar images, LiDAR images, or other information about objects in the roadway that can be used to refine prediction, perception, and detection algorithms, effectively instructing an autonomous vehicle as to when and where such images or information of the same type can be collected for logging of images and transforming the images or information for improving an algorithm.

BACKGROUND

An autonomous vehicle (AV) is required to find an optimal route from the AV's current location to a specified destination (e.g., a goal, a specific location, a position, etc.) in a geographic area of a road network. To travel autonomously, an AV requires autonomy software, sensors, and diagnostics to form and successfully traverse a route to a destination or a goal. A self-driving system (SDS), AV hardware, and AV software allows a vehicle to operate autonomously, without the need for a driver, within a specific geographic area. When an AV equipped with an SDS is in autonomous mode, the SDS will have full responsibility for the task of driving while meeting the standards for an automated driving system.

The autonomy software of the AV (e.g., SDS, etc.), in order to control AV operations, involves significant collection of onboard data, including logging of raw images and high quality images (i.e., high efficiency video coding (HEVC), H. 265, etc.) while traversing a roadway. Collection of such onboard data is a storage and bandwidth intensive task.

To improve the autonomy models (e.g. object detection, traffic light detection, lane detection, road edge detection, etc.) or develop new autonomy features, new data must be obtained from cameras or sensors (e.g., LiDAR, radar, etc.). For example, images are collected that require large amounts of data storage. The images (and/or labels for the images) may be used later for training either existing or new machine learning algorithms.

However, when navigating a roadway, storage capacity of an AV (e.g., hard drive capacity, etc.) may be very limited (e.g., may provide only enough for one hour of effective operation before storage is full, etc.). Thus, it makes sense when the car is already out, to keep it out as long as possible. In order for the AV to operate as long as possible, new systems and methods are needed for collecting data.

SUMMARY

Accordingly, disclosed are improved computer-implemented systems, methods, and computer program products for data-driven optimization of onboard data collection.

According to non-limiting embodiments or aspects, provided is a computer-implemented method for onboard data collection, comprising: identifying, by at least one processor, a condition in a roadway associated with an operation of one or more autonomous vehicles (AVs) that may be further optimized to improve performance of the one or more AVs; generating, by the at least one processor, one or more condition capture instructions to communicate to the one or more AVs, wherein the one or more condition capture instructions comprise one or more parameters of a storage request in one or more roadways predicted to exhibit the condition in the roadway, wherein, when at least one condition capture instruction in the one or more condition capture instructions are received by an AV computing system in at least one of the one or more AVs, the at least one condition capture instruction is configured to cause the at least one of the one or more AVs to collect condition information in the roadway at a time when the condition is predicted to be present in the roadway.

According to non-limiting embodiments or aspects, provided for onboard data collection system, comprising: a memory; and at least one processor coupled to the memory and configured to: identify a condition in a roadway associated with an operation of one or more autonomous vehicles (AVs) that may be further optimized to improve performance of the one or more AVs; and generate one or more condition capture instructions to communicate to the one or more AVs, one or more parameters of a storage request in one or more roadways predicted to exhibit the condition in the roadway, wherein, when at least one condition capture instruction in the one or more condition capture instructions are received by an AV computing system in at least one of the one or more AVs, the at least one condition capture instruction is configured to cause the at least one AV of the one or more AVs to collect condition information in the roadway at a time when the condition is predicted to be present in the roadway.

According to non-limiting embodiments or aspects, provided is a non-transitory computer-readable medium having instructions stored thereon that, when executed by at least one computing device, cause the at least one computing device to: identify a condition in a roadway associated with an operation of one or more autonomous vehicles (AVs) that may be further optimized to improve performance of the one or more Avs; and generate one or more condition capture instructions to communicate to the one or more Avs, one or more parameters of a storage request in one or more roadways predicted to exhibit the condition in the roadway; wherein, when at least one instruction in the one or more condition capture instructions are received by an AV computing system in at least one of the one or more Avs, the at least one condition capture instruction is configured to cause the at least one AV of the one or more AVs to collect condition information in the roadway at a time when the condition is predicted to be present in the roadway.

Non-limiting embodiments or aspects are set forth in the following numbered clauses:

Clause 1: A computer-implemented method of onboard data collection, comprising: identifying, by at least one processor, a condition in a roadway associated with an operation of one or more autonomous vehicles (AVs) that may be further optimized to improve performance of the one or more AVs; generating, by the at least one processor, one or more condition capture instructions to communicate to the one or more AVs, wherein the one or more condition capture instructions comprise one or more parameters of a storage request in one or more roadways predicted to exhibit the condition in the roadway, wherein, when at least one condition capture instruction in the one or more condition capture instructions are received by an AV computing system in at least one of the one or more AVs, the at least one condition capture instruction is configured to cause the at least one of the one or more AVs to collect condition information in the roadway at a time when the condition is predicted to be present in the roadway.

Clause 2: The computer-implemented method of clause 1, wherein generating the one or more condition capture instructions comprises: checking the confidence interval of a specific metric associated with the condition in the roadway to determine whether each of the one or more roadways is in a specific target range; determining a confidence interval of a specific metric associated with the condition in the roadway is in a specific target range for at least one roadway of the one or more roadways; and in response to determining the confidence interval is within a specific target range for the at least one roadway, transmitting, to the at least one of the one or more AVs, an instruction in the one or more condition capture instructions to collect condition information in the at least one roadway.

Clause 3: The computer-implemented method of clauses 1-2, wherein the condition in the roadway is determined to be present by determining target information based on one or more objects identified in information previously collected which also include the condition in the roadway, and the target information includes parameters for at least one of a place, a location, or a time, for controlling logging information when the condition in the roadway is predicted to be present.

Clause 4: The computer-implemented method of clauses 1-3, further comprising: determining a time or location when a first AV of the one or more AVs may traverse a roadway having an observable condition; determining a time or location when a second AV of the one or more AVs may traverse a roadway having an observable condition related to at least one of a place, location, or time, that should be logged; matching roadway information from one or more sources of information that are related to at least one of the condition in the roadway; and sending an instruction to the one or more AVs to cause the first AV and the second AV to log information of the roadway in an environment surrounding each respective AV for a specified location at the predicted time.

Clause 5: The computer-implemented method of clauses 1-4, further comprising: determining that a threshold number of AVs have previously collected information about the specified place, location, or time; and sending an instruction to a fleet of AVs to cause each of the one or more AVs of the fleet of AVs to stop logging information for the specified place, location, or time.

Clause 6: The computer-implemented method of clauses 1-5, wherein the condition in the roadway includes a naturally occurring situation in and around a roadway that may affect one or more operations of the at least one of the one or more AVs, execution, movement, or action, and wherein at least one signal, factor, or object serves as a proxy for the naturally occurring condition.

Clause 7: The computer-implemented method of clauses 1-6, further comprising: mining a plurality of roadway images from one or more data sources for factors relating to a reoccurring situation in the roadway; associating the plurality of roadway images with one or more other roadways to traverse based on location and time; generating a configuration file with the one or more condition capture instructions for an AV of the one or more AVs to collect information; and collecting information based on the configuration file.

Clause 8: The computer-implemented method of clauses 1-7, wherein the onboard data collection is optimized by performing at least one of: obtaining a specified number of images, obtaining a number of images to perform a specific process, or obtaining a number of images to update an inference engine.

Clause 9: The computer-implemented method of clauses 1-8, wherein the onboard data collection is optimized by eliminating or decreasing processing for logging, review, or analysis of objects, wherein logging comprises eliminating extra logging by logging based on AV mining of: images that improve perception of autonomous systems or contribute to solving problems associated with navigating in the roadway.

Clause 10: A system, comprising: a memory; and at least one processor coupled to the memory and configured to: identify a condition in a roadway associated with an operation of one or more autonomous vehicles (AVs) that may be further optimized to improve performance of the one or more AVs; and generate one or more condition capture instructions to communicate to the one or more AVs, one or more parameters of a storage request in one or more roadways predicted to exhibit the condition in the roadway, wherein, when at least one condition capture instruction in the one or more condition capture instructions are received by an AV computing system in at least one of the one or more AVs, the at least one condition capture instruction is configured to cause the at least one AV of the one or more AVs to collect condition information in the roadway at a time when the condition is predicted to be present in the roadway.

Clause 11: The system of clause 10, wherein the at least one processor is further configured to: check the confidence interval of a specific metric associated with the condition in the roadway to determine whether each of the one or more roadways is in a specific target range; determine a confidence interval of a specific metric associated with the condition in the roadway is in a specific target range for at least one roadway of the one or more roadways; and in response to determining the confidence interval is within a specific target range for the at least one roadway, transmit, to the at least one AV of the one or more AVs, an instruction in the one or more condition capture instructions to collect condition information in the at least one roadway.

Clause 12: The system of clauses 10-11, wherein the condition in the roadway is determined to be present by determining target information based on one or more objects identified in information previously collected which also include the condition in the roadway, and the target information includes parameters for at least one of a place, a location, or a time, for controlling logging information when the condition in the roadway is predicted to be present.

Clause 13: The system of clauses 10-12, wherein the at least one processor is further configured to: determine a time or location when a first AV of the one or more AVs may traverse a roadway having an observable condition; determine a time or location when a second AV of the one or more AVs may traverse a roadway having an observable condition related to at least one of a place, location, or time, that should be logged; match roadway information from one or more sources of information that are related to at least one of the condition in the roadway; and send an instruction to the one or more AVs to cause the first AV and the second AV to log information of the roadway in an environment surrounding each respective AV for a specified location at the predicted time.

Clause 14: The system of clauses 10-13, wherein the at least one processor is configured to: determine that a threshold number of AVs have previously collected information about the specified place, location, or time; and send an instruction to a fleet of AVs to cause each of the one or more AVs of the fleet of AVs to stop logging information for the specified place, location, or time.

Clause 15: The system of clauses 10-14, wherein the condition in the roadway includes a naturally occurring situation in and around a roadway that may affect one or more operations of the at least one AV of the one or more AVs, execution, movement, or action, and wherein at least one signal, factor, or object serves as a proxy for the naturally occurring condition.

Clause 16: The system of clauses 10-15, wherein the at least one processor is further configured to: mine a plurality of roadway images from one or more data sources for factors relating to (or matching) a reoccurring situation in the roadway; associate the plurality of roadway images with one or more other roadways to traverse based on location and time; generate a configuration file with the one or more condition capture instructions for an AV of the one or more AVs to collect information; and collect information based on the configuration file.

Clause 17: The system of clauses 10-16, wherein the processor is further configured to perform at least one of: obtaining a specified number of images, obtaining a number of images to perform a specific process, or obtaining a number of images to update an inference engine.

Clause 18: The system of clauses 10-17, wherein the processor is further configured to eliminate or decrease processing for logging, review, or analysis of objects, wherein logging comprises eliminating extra logging by logging based only on AV mining, comprising: collecting images that improve perception of autonomous systems or contribute to solving problems associated with navigating in the roadway.

Clause 19: A non-transitory computer-readable medium having instructions stored thereon that, when executed by at least one computing device, cause the at least one computing device to: identify a condition in a roadway associated with an operation of one or more autonomous vehicles (AVs) that may be further optimized to improve performance of the one or more AVs; and generate one or more condition capture instructions to communicate to the one or more AVs, one or more parameters of a storage request in one or more roadways predicted to exhibit the condition in the roadway; wherein, when at least one condition capture instruction in the one or more condition capture instructions are received by an AV computing system in at least one of the one or more AVs, the at least one condition capture instruction is configured to cause the at least one AV of the one or more AVs to collect condition information in the roadway at a time when the condition is predicted to be present in the roadway.

Clause 20: The non-transitory computer-readable medium of clause 19, having further instructions stored thereon that, when executed by at least one computing device, cause the at least one computing device to: check the confidence interval of a specific metric associated with the condition in the roadway to determine whether each of the one or more roadways is in a specific target range; determine a confidence interval of a specific metric associated with the condition in the roadway is in a specific target range for at least one roadway of the one or more roadways; and in response to determining the confidence interval is within a specific target range for the at least one roadway, transmit, to the AV, an instruction in the one or more condition capture instructions to collect condition information in the at least one roadway.

These and other features and characteristics of the present disclosure, as well as, the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure.

BRIEF DESCRIPTION OF THE DRAWINGS

The accompanying drawings are incorporated herein and form a part of the specification.

FIG. 4 illustrates non-limiting embodiments or aspects of a roadway environment in which systems, apparatuses, and/or methods of data-driven optimization of onboard data collection as described herein, may be implemented;

In the drawings, like reference numbers generally indicate identical or similar elements. Additionally, generally, the left-most digit(s) of a reference number identifies the drawing in which the reference number first appears.

DETAILED DESCRIPTION

Figure 1:
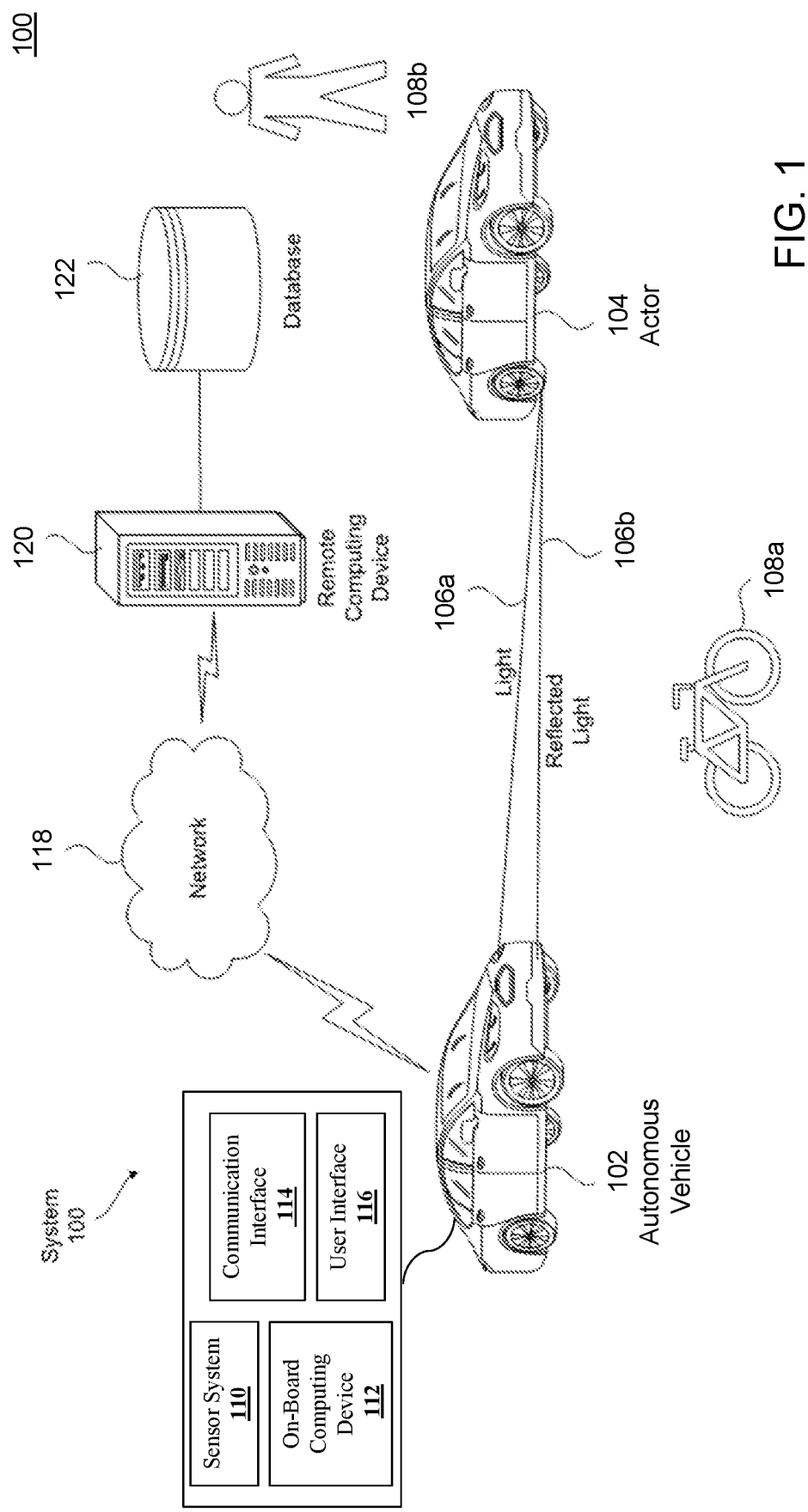
FIG. 1 is a diagram of non-limiting embodiments or aspects of an exemplary autonomous vehicle system, in accordance with aspects of the present disclosure.

Self-driving cars require precise visual training to detect or recognize objects on a street and to travel in a correct lane to avoid collisions with other objects in the roadway. However, due to limited storage, an autonomous vehicle (AV)

may not be able to collect and store all images (or other information) present in the roadway of the AV. For example, an AV may not have enough storage to collect images (e.g., camera images, LiDAR images, Radar images, etc.) in each situation where the AV is in the view of a condition in the roadway.

In some examples, existing AV systems and AVs may not be capable to receive granular instructions for when or where to collect image data. In addition, existing AV systems may not be capable to efficiently collect images over an extended period of time given storage constraints, since existing systems are incapable of data-driven optimization of onboard data collection for reducing the number of images captured while traversing a roadway.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments or aspects disclosed herein are not to be considered as limiting unless otherwise indicated. In addition, terms of relative position, such as, "vertical" and "horizontal", "ahead" and "behind", or "front" and "rear", when used, are intended to be relative to each other and need not be absolute, and only refer to one possible position of the device associated with those terms depending on the device's orientation.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Additionally, when terms, such as, "first" and "second" are used to modify a noun, such use is simply intended to distinguish one item from another, and is not intended to require a sequential order unless specifically stated.

In some non-limiting embodiments or aspects, one or more aspects may be described herein, in connection with thresholds (e.g., a tolerance, a tolerance threshold, etc.). As used herein, satisfying a threshold may refer to a value (e.g., a score, an objective score, etc.) being greater than the threshold, more than the threshold, higher than the threshold, greater than or equal to the threshold, less than the threshold, fewer than the threshold, lower than the threshold, less than or equal to the threshold, equal to the threshold, etc.

As used herein, the terms "communication" and "communicate" may refer to the reception, receipt, transmission, transfer, provision, and/or the like of information (e.g., data, signals, messages, instructions, commands, and/or the like). For one component (e.g., a unit, a device, a system, an element, or a component, of a device or system, combinations thereof, and/or the like) to be in communication with another component means that the one component is able to directly or indirectly receive information from and/or send (e.g., transmit) information to the other component. This may refer to a direct or indirect connection that is wired and/or wireless in nature. Additionally, two components may be in communication with each other even though the information transmitted may be modified, processed, relayed, and/or routed between the first and second component. For example, a first component may be in communication with a second component even though the first component passively receives information and does not actively send information to the second component. As another example, a first component may be in communication with a second component if at least one intermediary component (e.g., a third component located between the first component and the second component) processes information received from the first component and sends the processed information to the second component. In some non-limiting embodiments or aspects, a message may refer to a network packet (e.g., a data packet and/or the like) that includes data.

As used herein, the term "computing device", "electronic device", or "computer" may refer to one or more electronic devices configured to process data. A computing device may, in some examples, include the necessary components to receive, process, and output data, such as, a processor, a display, a memory, an input device, a network interface, and/or the like. A computing device may be included in a device on-board an AV. As an example, a computing device may include an on-board specialized computer (e.g., a sensor, a controller, a data store, a communication interface, a display interface, etc.), a mobile device (e.g., a smartphone, standard cellular phone, or integrated cellular device,), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "client", "client device", and "remote device" may refer to one or more computing devices that access a service made available by a server. In some non-limiting embodiments or aspects, a "client device" may refer to one or more devices that facilitate a maneuver by an AV, such as, one or more remote devices communicating with an AV. In some non-limiting embodiments or aspects, a client device may include a computing device configured to communicate with one or more networks and/or facilitate vehicle movement, such as, but not limited to, one or more vehicle computers, one or more mobile devices, and/or other like devices.

As used herein, the term "server" may refer to or include one or more computing devices that are operated by or facilitate communication and processing for multiple parties in a network environment, such as, the Internet, although it will be appreciated that communication may be facilitated over one or more public or private network environments and that various other arrangements are possible. Further, multiple computing devices (e.g., servers, data stores, controllers, communication interfaces, mobile devices, and/or the like) directly or indirectly communicating in the network environment may constitute a "system." The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices, such as, but not limited to, processors, servers, client devices, sensors, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function. The terms "memory," "memory device," "data store," "data storage facility," and the like each refer to a non-transitory device on which computer-readable data, programming instructions, or both are stored. Except where specifically stated otherwise, the terms "memory," "memory device," "data store," "data storage facility," and the like are intended to include single device embodiments, embodiments in which multiple memory devices together or collectively store a set of data or instructions, as well as, individual sectors within such devices.

According to some non-limiting embodiments, the term "vehicle" refers to any moving form of conveyance that is capable of carrying either one or more human occupants and/or cargo and is powered by any form of energy. The term "vehicle" includes, but is not limited to, cars, trucks, vans, trains, AVs, aircraft, aerial drones, and the like. An AV is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. The AV can be a ground-based AV (e.g., car, truck, bus, etc.), an air-based AV (e.g., airplane, drone, helicopter, or other aircraft), or other types of vehicles (e.g., watercraft).

As used herein, the terms "trajectory" and "trajectories" may refer to a path (e.g., a path through a geospatial area, etc.) with positions of the AV along the path with respect to time, where a "path" generally implies a lack of temporal information, such as one or more paths for navigating an AV in a roadway for controlling travel of the AV on the roadway. A trajectory may be associated with a map of a geographic area including the roadway. In such an example, the path may traverse a roadway, an intersection, another connection or link of the road with another road, a lane of the roadway, objects in proximity to and/or within the road, and/or the like. For example, a trajectory may define a path of travel on a roadway for an AV that follows each of the rules (e.g., the path of travel does not cross a yellow line, etc.) associated with the roadway. In such an example, an AV that travels over or follows the trajectory (e.g., that travels on the roadway without deviating from the trajectory, etc.) may obey each of the rules or account for constraints (e.g., objects in the roadway, does not cross the yellow line, etc.) associated with the roadway.

As used herein, "map data" and "sensor data" includes data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. According to some non-limiting embodiments, a map of a geographic location (or area) includes one or more routes (e.g., a nominal route, a driving route, etc.) that include one or more roadways. According to some non-limiting embodiments or aspects, map data (e.g., Google maps, Open Street Map (OSM), Tiger flies (e.g., geospatial data, map data, etc.) associated with a map of the geographic location associates the one or more roadways with an indication of whether an AV can travel on that roadway.

As used herein, "sensor data" includes data from one or more sensors. For example, sensor data may include light detection and ranging (LiDAR) point cloud maps (e.g., map point data, etc.) associated with a geographic location (e.g., a location in three-dimensional space relative to the LiDAR system of a mapping vehicle in one or more roadways) of a number of points (e.g., a point cloud) that correspond to objects that have reflected a ranging laser of one or more mapping vehicles at the geographic location (e.g. an object such as a vehicle, a bicycle, a pedestrian, etc. in the roadway). As an example, sensor data may include LiDAR point cloud data that represents objects in the roadway, such as, other vehicles, pedestrians, cones, debris, and/or the like.

As used herein, a "road" refers to a paved or an otherwise improved path (e.g., street, road segment, etc.) between two places that allows for travel by a vehicle (e.g., AV). Additionally or alternatively, a road includes a roadway and a sidewalk in proximity to (e.g., adjacent, near, next to, abutting, touching, etc.) the roadway. In some non-limiting embodiments or aspects, a roadway includes a portion of a road on which a vehicle is intended to travel and is not restricted by a physical barrier or by separation so that the vehicle is able to travel laterally. Additionally or alternatively, a roadway (e.g., a road network, one or more roadway segments, etc.) includes one or more lanes in which a vehicle may operate, such as, a travel lane (e.g., a lane upon which a vehicle travels, a traffic lane, etc.), a parking lane (e.g., a lane in which a vehicle parks), a turning lane (e.g., a lane in which a vehicle turns from), and/or the like. Additionally or alternatively, a roadway includes one or more lanes in which a pedestrian, bicycle, or other vehicle may travel, such as, a crosswalk, a bicycle lane (e.g., a lane in which a bicycle travels), a mass transit lane (e.g., a lane in which a bus may travel), and/or the like. According to some non-limiting embodiments, a roadway is connected to another roadway to form a road network, for example, a lane of a roadway is connected to another lane of the roadway and/or a lane of the roadway is connected to a lane of another roadway. In some non-limiting embodiments, an attribute of a roadway includes a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like.

As used herein, navigating (e.g., traversing, driving, etc.) a route may involve the creation of at least one trajectory or path through the road network and may include any number of maneuvers or an evaluation of any number of maneuvers (e.g., a simple maneuver, a complex maneuver, etc.), such as, a maneuver involving certain driving conditions, such as, dense traffic, where successfully completing a lane change may require a complex maneuver, like speeding up, slowing down, stopping, or abruptly turning, for example, to steer into an open space between vehicles, pedestrians, or other objects (as detailed herein) in a destination lane. Additionally, in-lane maneuvers may also involve an evaluation of any number of maneuvers, such as, a maneuver to traverse a lane split, an intersection (e.g., a three-leg, a four-leg, a multi-leg, a roundabout, a T-junction, a Y-intersection, a traffic circle, a fork, turning lanes, a split intersection, a town center intersection, etc.), a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane from which a vehicle turns, etc.), merging lanes (e.g., two lanes merging to one lane, one lane ends and merges into a new lane to continue, etc.), and/or the like. Maneuvers may also be based on current traffic conditions that may involve an evaluation of any number of maneuvers, such as, a maneuver based on a current traffic speed of objects in the roadway, a current traffic direction (e.g., anti-routing traffic, wrong-way driving, or counter flow driving, where a vehicle is driving against the direction of traffic and/or against the legal flow of traffic), current accidents or other incidents in the roadway, weather conditions in the geographic area (e.g., rain, fog, hail, sleet, ice, snow, etc.), or road construction projects. In addition, maneuvers may also involve an evaluation of any number of objects in and around the roadway, such as, a maneuver to avoid an object in proximity to a road, such as, structures (e.g., a building, a rest stop, a toll booth, a bridge, etc.), traffic control objects (e.g., lane markings, traffic signs, traffic lights, lampposts, curbs of the road, gully, a pipeline, an aqueduct, a speedbump, a speed depression, etc.), a lane of a roadway (e.g., a parking lane, a turning lane, a bicycle lane, etc.), a crosswalk, a mass transit lane (e.g., a travel lane in which a bus, a train, a light rail, and/or the like may travel), objects in proximity to and/or within a road (e.g., a parked vehicle, a double parked vehicle, vegetation, a lamppost, signage, a traffic sign, a bicycle, a railway track, a hazardous object, etc.), a sidewalk of a road, and/or the like.

For example, existing systems may only log information that is predetermined, preprogrammed, or purely random. In such examples, existing AV systems may not be able to selectively collect images needed, of interest, and/or necessary for improving the AV. For example, existing systems may have insufficient information to determine when to collect data, may have inaccurate information to identify time segments or locations that should be tracked, or may be unaware of important roadways. Therefore, existing systems may not be capable to optimize the amount of time it takes or to obtain a number of images needed (e.g., specify a certain number of images to collect, a time to collect images, etc.). Still further, existing systems may be unable to control an AV in the roadway, or may be unable to control an AV in general, to collect information at predetermined times or locations.

In further examples, existing AV systems may be incapable of collecting information by identifying a condition of the roadway, a time, a location, or other roadway information. Still further, the AV may be incapable of identifying a roadway for data collection based on how the AV is operating, for example, existing systems may have inadequate data, may be unable to obtain such data, or may have inaccurate data.

Existing AVs, AV fleets, or AV systems, may lack capabilities for efficient data searching, may be unable to obtain such data, may be unable to efficiently obtain such data, may be unable to label such data, or may be unable to efficiently search and label such data if it is obtained, and existing system may therefore be unable to perform a data driven approach to obtain data from sources of information and lack an ability to determine places, locations, times, etc. associated with the data that should be logged. Existing systems may also lack a uniform software configuration for each car in a fleet, or may have no communication protocol for communicating instructions to a car.

Finally, existing systems may not be able to communicate an instruction to a car based on determining a search is complete. For example, existing systems may not be able to communicate an instruction to a car to avoid a collection after determining one or more other AVs in the roadway have already made such a collection while the car was traversing the roadway. Existing systems may not know or be able to determine that other cars already passed a location where logging was needed and/or has already collected data in the same area.

The present disclosure provides an improved method, system, and computer program product for data-driven optimization of onboard data collection, such as by identifying, by at least one processor, a condition in a roadway associated with an operation of one or more autonomous vehicles (AVs) that may be further optimized to improve performance of the one or more AVs; generating one or more condition capture instructions to communicate to the one or more AVs, one or more parameters of a storage request in one or more roadways predicted to exhibit the condition in the roadway; in response to receiving at least one instruction in the one or more condition capture instructions, collecting, by an AV computing system of at least one of the one or more AVs, condition information in the roadway at a time when the condition is predicted to be present in the roadway; and controlling at least one AV during navigation of the condition in another roadway after optimizing the operation of the at least one AV based on the condition information previously collected.

In this way, in some non-limiting embodiments or aspects, an AV is configured to selectively collect images (e.g., limit collection) that are needed or most interesting and/or necessary for improving the AV. In addition, limits may be placed and enforced for storage, and by placing such limits on the storage of images in a car, storage is conserved and the AV can remain on the road longer, and is able to further communicate and/or obtain instructions to store only images that are determined to be interesting or needed for predetermined particular purposes, such as collecting images that may be captured and used to improve operations of an AV or a fleet of AVs. Such focused storage of images may extend the storage time, and thereby the travel time for the AV.

In some examples, if an AV in the fleet has already gathered image information that is needed, a fleet controller (e.g., a remote computer, a cloud computer, a lead AV, etc.) of an AV can send a configuration to an AV (e.g., any AV in the fleet, each AV in the fleet, etc.) with instructions to avoid logging such images again. For example, if the AV fleet already collected a number of scenes of a tunnel (e.g., 500 scenes, etc.), the AV controller can be programmed or configured to send a communication to other AVs in the fleet (e.g., AVs three and four, etc.) instructing them to not collect such information because AVs one and two have already collected the information. In other examples, if an AV is determined to be nearly full with regard to storage, the AV can be configured to immediately stop collecting, and only receive collection instructions that are of a critical nature, not receive instructions unless critical, or ignore such instructions unless critical instructions are received otherwise using the data-driven approach to obtain the data from other sources (e.g., in the AV) for information about specified places, locations, or times that should be logged.

In some non-limiting embodiments or aspects, an AV is configured for smarter logging of images, based on narrow instructions to collect images only during specific events (e.g. driver takeover, random mining, fine class mining, etc.). In this way, only images that are relevant and useful for improving performance of algorithms can be targeted for collection. Such images are important to find, since they may contribute to labeling things that are interesting to us.

In some non-limiting embodiments or aspects, images are introduced for training one or more machine learning algorithms. In such an example, using data-driven optimization of onboard data collection extends the time of travel for the AV, smart logging of images that include a large storage footprint can be performed, and such images may be omitted or captured only a predetermined number times before canceling the collection of the images, storing only images needed. Thereby obtaining, storing, and capturing only images of interest, and extending a travel time of the AV. In this way, the system can log only images that are relevant and useful for improving performance of algorithms, contribute to only labeling roadway aspects of interest, and eliminating the need for situations where images in the cars view are automatically collected while traversing the roadway.

In some non-limiting embodiments or aspects, triggers in the car, executes sampling and logging of images, such as random or configuration based, such that a configuration file (e.g., a communication) is sent to a car to trigger. The trigger is configured to execute when a car drives on a particular lane segment or at a particular time, to log that lane segment. For example, triggers may fire (e.g., execute, activate, etc.) depending on the status of the AV with respect to the roadway. A trigger may include an image timestamp (when was that logged) and which segment (part of street that was logged) to find objects of interest.

In some non-limiting embodiments or aspects, determining when to collect data, and identifying those time segments to track is optimized so that the amount of time required may be reduced or managed. For example, an AV may have a logger in the car which is a hard drive and software which performs a task, such as instructions in the configuration which are provided. Then, when the AV obtains the information that the AV is on the segment, the AV trigger initiates the logger to save an image. In some examples, the logger may include a buffer, to account for a delay and make it possible to log information before and after the trigger. In this way, the AV may dedicate more resources to processing autonomy functions, such as perception and localization, determining the route, determining a sequence of lanes, LiDAR that needs to be stored, and configuration eliminates a need to store everything the car sees, eliminating a need for the AV to return to the garage, while providing a backbone to the system for storing any relevant information, storing images based on a condition (e.g., a time, a location, an action the AV is performing, etc.), storing primarily camera images, or fusing information for unified perception from separate pipelines for camera, LIDAR, Radar, Audio (from microphones), onboard devices, and/or the like.

In this way, the data-driven optimization of onboard data collection provides capability to receive granular instructions for when or where to collect image data, providing capability to collect images for a long period of time, by reducing the number of images captured while traversing a roadway, logging information that is predetermined and preprogrammed, to selectively collect images needed, of interest, and/or necessary for improving the AV, and including efficient processing of information for the AV to determine when to collect data, include accurate information to identify time segments or locations that should be tracked, or may include important roadways, to optimize the amount of time it takes or to obtain a number of images needed (e.g., specify a certain number of images to collect, a time to collect images, etc.), or control an AV in the roadway, or control an AV in general, to collect information at predetermined times or locations.

Still further, improved systems, methods, and computer program products can also help to more accurately or efficiently collect information by identifying a condition of the roadway, a time, a location, or other conditions in the roadway, may be capable of more efficient or accurate identifying a roadway for data collection based on how the AV is operating.

The improved systems, methods, and computer program products can also help to reduce or eliminate a need to obtain universal imaging, such that one or more AVs, AV fleets, or AV systems, using data-driven optimization of onboard data collection of the present invention, may more efficiently search and label collection data if it is obtained, and may therefore be capable to perform a data driven approach to obtain data from sources of information and lack an ability to determine places, locations, times, etc. associated with the data that should be logged, or receive a uniform software configuration for each car in a fleet, or may have no communication protocol for communicating instructions to a car, or communicate an instruction to a car based on determining a search is complete, for example, to communicate an instruction to an AV to avoid a collection after determining one or more other AVs in the roadway have already made such a collection while the car was traversing the roadway.

FIG. 1 provides one non-limiting embodiment of system 100 in which devices, systems, and/or methods, herein, may be implemented. System 100 comprises autonomous vehicle 102 (e.g., AV 102, and referred to herein as one or more AVs 102 when more than one AV may perform an action) that is traveling along a road in a semi-autonomous or autonomous manner. AV 102 is also referred to herein as vehicle 102.

AV 102 is generally configured to detect objects in the roadway, such as actor 104, bicyclist 108a, and pedestrian 108b in proximity thereto. The objects can include, but are not limited to, a vehicle, such as actor 104, bicyclist 108a (e.g., a rider of a bicycle, an electric scooter, a motorcycle, or the like) and/or pedestrian 108b. Actor 104 may be an autonomous vehicle, a semi-autonomous vehicle, or alternatively, a non-autonomous vehicle controlled by a driver.

As illustrated in FIG. 1, AV 102 may include sensor system 110, on-board computing device 112, communication interface 114, and user interface 116. AV 102 may further include certain components (as illustrated, for example, in FIG. 2) included in vehicles, which may be controlled by on-board computing device 112 using a variety of communication signals and/or commands, such as, for example, acceleration signals or commands, deceleration signals or commands, steering signals or commands, braking signals or commands, etc. For example, AV 102 may include a logger which is a hard drive programmed with software that receives a configuration, provided by a trusted party that provides information about when and where AV 102 should collect information (e.g., images, sensor data, etc.).

Figure 2:
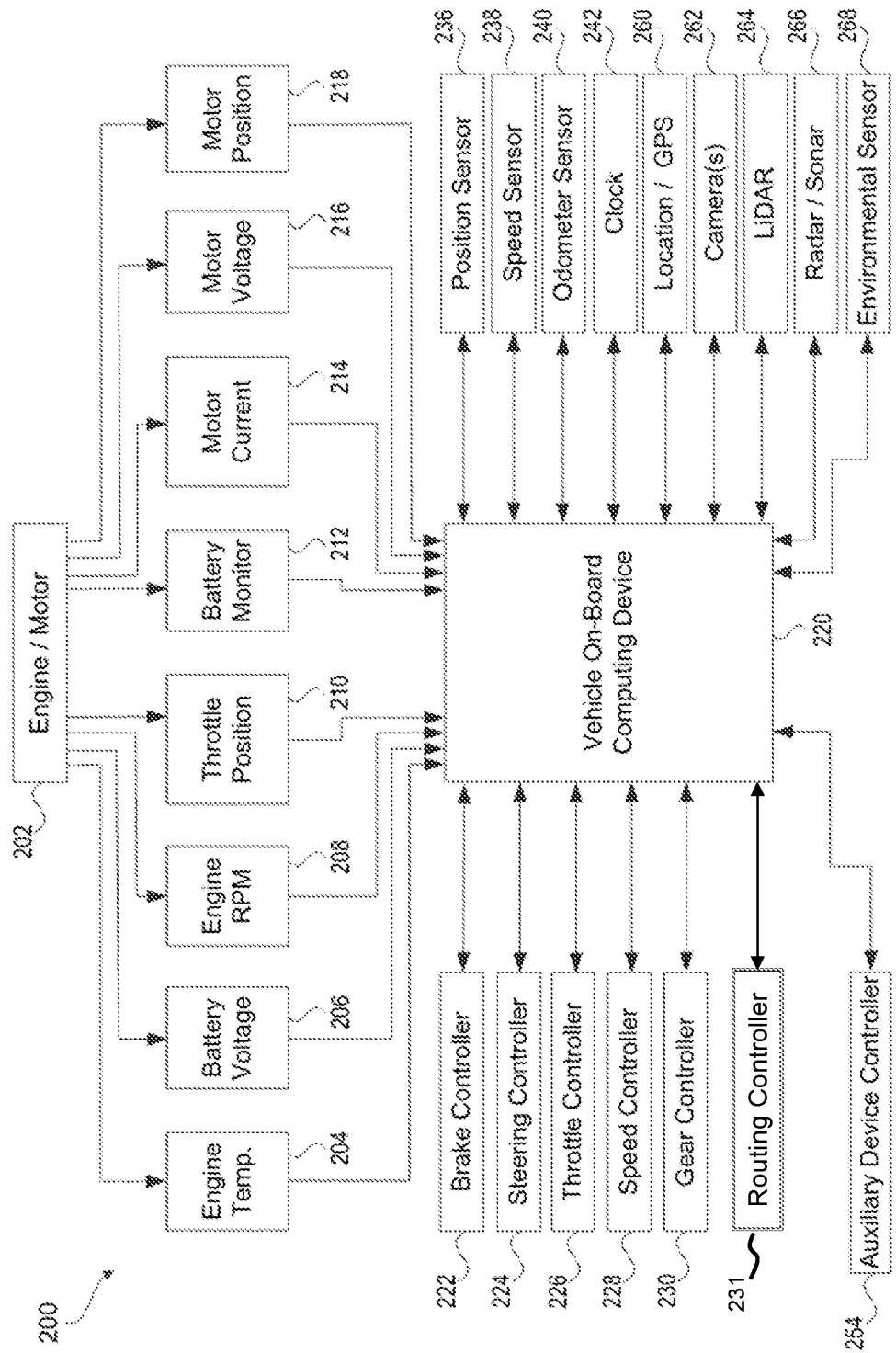
FIG. 2 is a diagram of non-limiting embodiments or aspects of an exemplary architecture for a vehicle in which data-driven optimization of onboard data collection, as described herein, may be implemented to protect communications.

Sensor system 110 may include one or more sensors that are coupled to and/or are included within AV 102, as illustrated in FIG. 2. For example, such sensors may include, without limitation, a laser detection system, a radio detection and ranging (RADAR) system, a light detection and ranging (LiDAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, and/or the like. The sensor data can include information that describes the location of objects within the surrounding environment of AV 102, information about the environment itself, information about the motion of AV 102, information about a route of AV 102, and/or the like. As AV 102 moves over a surface, at least some of the sensors may collect data pertaining to the surface.

In some non-limiting embodiments or aspects, one or more processors of AV 102 can send a communication protected by end-to-end CRC overhead hiding that includes sensor information identifying a location of objects within the surrounding environment of AV 102, information describing the environment itself, information about the motion of AV 102, information about a route of AV 102, information about a position of AV 102 (or other objects in the roadway) while traversing a route of AV 102 and/or the like. As AV 102 moves over a surface, at least some of the sensors may collect data pertaining to the surface.

As will be described in greater detail, AV 102 may be configured with a LIDAR system (e.g., LiDAR 264 of FIG. 2.) The LiDAR system may be configured to transmit light pulse 106a to detect objects located within a distance or range of distances of AV 102. Light pulse 106a may be incident on one or more objects (e.g., actor 104, bicyclist 108a, pedestrian 108b) and be reflected back to the LiDAR system. Reflected light pulse 106b incident on the LiDAR system may be processed to determine a distance of that object to AV 102. Reflected light pulse 106b may be detected using, in some non-limiting embodiments, a photodetector or array of photodetectors positioned and configured to receive the light reflected back into the LiDAR system.

LiDAR information, such as detected object data, is communicated from the LiDAR system to on-board computing device 112 (e.g., one or more processors of AV 102, vehicle on-board computing device 220 of FIG. 2, etc.). AV 102 may also communicate LiDAR data to remote computing device 120 (e.g., cloud processing system) over communications network 118. Remote computing device 120 may be configured with one or more servers to process one or more processes of the technology described herein. Remote computing device 120 may also be configured to communicate data/instructions to/from AV 102 over network 118, to/from server(s) and/or database(s) 122. For example, remote computing device 120 can communicate a trigger to one car or many cars simultaneously. In such an example, when AV 102 enters a roadway (e.g., road segment, lane segment, etc.) that is associated with a trigger, the trigger invokes the logger to save an image of the area as described below. In addition, the logger has a buffer, so there is a delay, and the buffer makes it possible to log information before and after the trigger. When AV 102 is triggered, it identifies and stores a number of items, including time, location, what operations or actions the AV is performing, store data, store camera images, and/or the like. Instead of constantly logging information, AV 102 is very specific as to what is collected (e.g., logged, etc.).

In some non-limiting embodiments or aspects, LiDAR systems for collecting data pertaining to the surface may be included in systems other than AV 102, such as, without limitation, other vehicles (autonomous or driven), mapping vehicles, robots, satellites, etc.

Network 118 may include one or more wired or wireless networks. For example, network 118 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or obtain track data, confidence level logic, optimizing data, association data, information, and/or the like, delivered via network 118 from database 122. Database 122 may be configured to store and supply raw data, indexed data, structured data, map data, program instructions, or other configurations as is known.

Communication interface 114 may be configured to allow communication between AV 102 and external systems, such as, for example, external devices, sensors, other vehicles, servers, data stores, databases, and/or the like. Communications interface 114 may utilize any now or hereafter known protocols, protection schemes, encodings, formats, packaging, etc. such as, without limitation, Wi-Fi, an infrared link, Bluetooth, etc. User interface 116 may be part of peripheral devices implemented within AV 102 including, for example, a keyboard, a touch screen display device, a microphone, and a speaker, etc.

Referring now to FIG. 2, FIG. 2 illustrates an exemplary system architecture 200 for a vehicle, in accordance with aspects of the disclosure. AV 102 (or vehicles 104) of FIG. 1 can have the same or similar system architecture as that shown in FIG. 2. Thus, the following discussion of system architecture 200 is sufficient for understanding vehicle(s)

102 and 104 of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors, and controllers may be included based on a type of vehicle, as is known.

As shown in FIG. 2, system architecture 200 of AV 102 includes an engine or motor 202 and various sensors 204-218 for measuring various parameters of the vehicle. In gas-powered or hybrid vehicles having a fuel-powered engine, the sensors may include, for example, engine temperature sensor 204, battery voltage sensor 206, engine rotations per minute (RPM) sensor 208, and throttle position sensor 210. If the vehicle is an electric or hybrid vehicle, then the vehicle may have an electric motor, and accordingly includes sensors such as battery monitoring system 212 (to measure current, voltage and/or temperature of the battery), motor current 214, motor voltage 216 sensors, and motor position sensors 218 such as resolvers and encoders.

Operational parameter sensors that are common to both types of vehicles include, for example: position sensor 236 such as an accelerometer, gyroscope and/or inertial measurement unit; speed sensor 238; and odometer sensor 240. The vehicle also may have clock 242 that the system uses to determine vehicle time during operation. Clock 242 may be encoded into vehicle on-board computing device 220, it may be a separate device, or multiple clocks may be available.

The vehicle also includes various sensors that operate to gather information about the environment in which the vehicle is traveling. These sensors may include, for example: location sensor 260 (e.g., a Global Positioning System (GPS) device); object detection sensors such as one or more cameras 262; LiDAR 264; and/or radar and/or sonar system 266. The sensors also may include environmental sensors 268 such as a precipitation sensor and/or ambient temperature sensor. The object detection sensors may enable the vehicle to detect objects that are within a given distance range of the vehicle (e.g., AV 102) in any direction, while the environmental sensors collect data about environmental conditions within the vehicle's area of travel.

During operations, information is communicated from the sensors to vehicle on-board computing device 220. Vehicle on-board computing device 220 is implemented using the computer system of FIG. 6. Vehicle on-board computing device 220 analyzes the data captured by the sensors and optionally controls operations of the vehicle based on results of the analysis. For example, vehicle on-board computing device 220 may control one or more of: braking via brake controller 222; direction via steering controller 224; speed and acceleration via throttle controller 226 (in a gas-powered vehicle) or motor speed controller 228 (such as a current level controller in an electric vehicle); differential gear controller 230 (in vehicles with transmissions); other controllers, and/or the like. Auxiliary device controller 254 may be configured to control one or more auxiliary devices, such as testing systems, auxiliary sensors, mobile devices transported by the vehicle, and/or the like.

Geographic location information may be communicated from location sensor 260 to vehicle on-board computing device 220, which may then access a map of the environment that corresponds to the location information to determine known fixed features of the environment such as streets, buildings, stop signs, and/or stop/go signals. Captured images from cameras 262 and/or object detection information captured from sensors such as LiDAR 264 is communicated from those sensors to vehicle on-board computing device 220. The object detection information and/or captured images are processed by vehicle on-board computing device 220 to detect objects in proximity to vehicle 102 (or AV 102). Any known or to be known technique for making an object detection based on sensor data and/or captured images can be used in the embodiments disclosed herein.

LIDAR information is communicated from LiDAR 264 to vehicle on-board computing device 220. Additionally, captured images are communicated from camera(s) 262 to vehicle on-board computing device 220. The LiDAR information and/or captured images are processed by vehicle on-board computing device 220 to detect objects in proximity to vehicle 102 (or AV 102). The manner in which the object detections are made by vehicle on-board computing device 220 includes such capabilities detailed in this disclosure.

Vehicle on-board computing device 220 may include and/or may be in communication with routing controller 231 that generates a navigation route from a start position to a destination position for an autonomous vehicle. Routing controller 231 may access a map data store to identify possible routes and road segments that a vehicle can travel on to get from the start position to the destination position. Routing controller 231 may score the possible routes and identify a preferred route to reach the destination. For example, routing controller 231 may generate a navigation route that minimizes Euclidean distance traveled or other cost function during the route, and may further access the traffic information and/or estimates that can affect an amount of time it will take to travel on a particular route. Depending on implementation, routing controller 231 may generate one or more routes using various routing methods, such as Dijkstra's algorithm, Bellman-Ford algorithm, or other algorithms. Routing controller 231 may also use the traffic information to generate a navigation route that reflects expected conditions of the route (e.g., current day of the week or current time of day, etc.), such that a route generated for travel during rush-hour may differ from a route generated for travel late at night. Routing controller 231 may also generate more than one navigation route to a destination and send more than one of these navigation routes to a user for selection by the user from among various possible routes.

In various embodiments, vehicle on-board computing device 220 may determine perception information of the surrounding environment of AV 102. Based on the sensor data provided by one or more sensors and location information that is obtained, vehicle on-board computing device 220 may determine perception information of the surrounding environment of AV 102. The perception information may represent detected objects that an ordinary driver would perceive in the surrounding environment of a vehicle. The perception data may include information relating to one or more objects in the environment of AV 102. For example, vehicle on-board computing device 220 may process sensor data (e.g., LiDAR or RADAR data, camera images, etc.) in order to identify objects and/or features in the environment of AV 102. The objects may include traffic signals, road way boundaries, other vehicles, pedestrians, and/or obstacles, etc. Vehicle on-board computing device 220 may use any now or hereafter known object recognition algorithms, video tracking algorithms, and computer vision algorithms (e.g., track objects frame-to-frame iteratively over a number of time periods) to determine the perception.

In some non-limiting embodiments, vehicle on-board computing device 220 may also determine, for one or more identified objects in the environment, the current state of the object. The state information may include, without limitation, for each object: current location; current speed and/or acceleration: current heading; current pose; current shape, size, or footprint; type (e.g., vehicle vs. pedestrian vs. bicycle vs. static object or obstacle); and/or other state information.

Vehicle on-board computing device 220 may perform one or more prediction and/or forecasting operations. For example, vehicle on-board computing device 220 may predict future locations, trajectories, and/or actions of one or more objects. For example, vehicle on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, AV 102, the surrounding environment, and/or their relationship(s).

In various embodiments, vehicle on-board computing device 220 may determine a motion plan for the autonomous vehicle. For example, vehicle on-board computing device 220 may determine a motion plan for the autonomous vehicle based on the perception data and/or the prediction data. Specifically, given predictions about the future locations of proximate objects and other perception data, vehicle on-board computing device 220 can determine a motion plan for AV 102 that best navigates the autonomous vehicle relative to the objects at their future locations.

In some non-limiting embodiments, vehicle on-board computing device 220 may receive predictions and make a decision regarding how to handle objects and/or actors in the environment of AV 102. For example, for a particular actor (e.g., a vehicle with a given speed, direction, turning angle, etc.), vehicle on-board computing device 220 decides whether to overtake, yield, stop, and/or pass based on, for example, traffic conditions, map data, state of the autonomous vehicle, etc. Furthermore, vehicle on-board computing device 220 also plans a path for AV 102 to travel on a given route, as well as driving parameters (e.g., distance, speed, and/or turning angle). That is, for a given object, vehicle on-board computing device 220 decides what to do with the object and determines how to do it. For example, for a given object, vehicle on-board computing device 220 may decide to pass the object and may determine whether to pass on the left side or the right side of the object (including motion parameters such as speed). Vehicle on-board computing device 220 may also assess the risk of a collision between a detected object and AV 102. If the risk exceeds an acceptable threshold, it may determine whether the collision can be avoided if the autonomous vehicle follows a defined vehicle trajectory and/or one or more dynamically generated emergency maneuvers is performed in a pre-defined time period (e.g., N milliseconds). If the collision can be avoided, then vehicle on-board computing device 220 may execute one or more control instructions to perform a cautious maneuver (e.g., mildly slow down, accelerate, or change lane). Vehicle on-board computing device 220 may execute one or more control instructions for execution of an emergency maneuver (e.g., brake and/or change direction of travel).

As discussed above, planning and control data related to maneuvering the autonomous vehicle in the roadway is generated for execution. Vehicle on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle may implement programming instructions that cause the controller to make decisions and use the decisions to control operations of one or more vehicle systems via the vehicle control system of the vehicle. However, the embodiments are not limited to this arrangement, as in various embodiments the analysis, decision making, and/or operational control may be handled in full or in part by other computing devices that are in electronic communication with the vehicle's on-board controller and/or vehicle control system. Examples of such other computing devices include an electronic device (such as, a smartphone) associated with a person who is riding in the vehicle, as well as, a remote server that is in electronic communication with the vehicle via a wireless network. The processor of any such device may perform the operations that will be discussed below.

Figure 3:
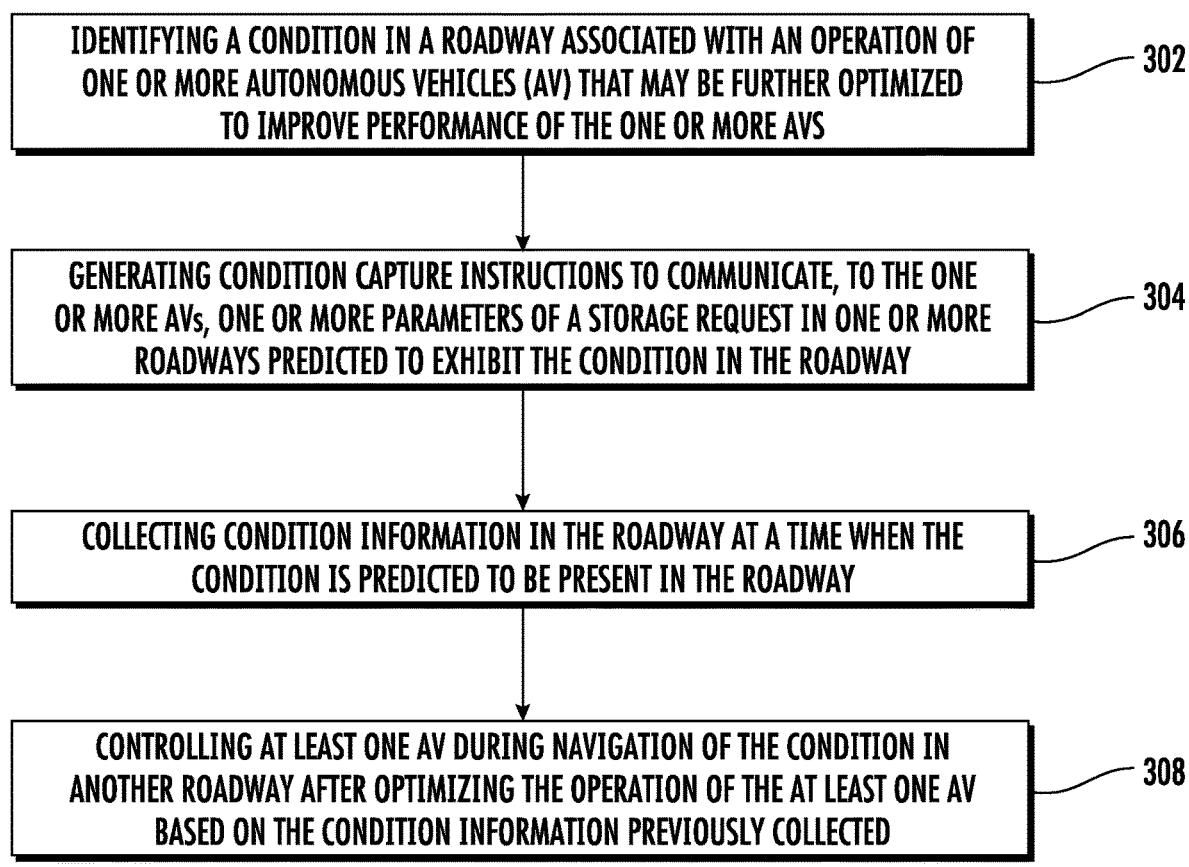
FIG. 3 is a flowchart of a non-limiting embodiment or aspect of a method for data-driven optimization of onboard data collection.

FIG. 3 illustrates a flowchart of a non-limiting embodiment or aspect of process 300 for data-driven optimization of onboard data collection in autonomous vehicle systems (e.g., self-driving systems of FIG. 1 and an autonomy vehicle control stack, sensors, control systems of FIG. 2, and/or the like) and other AV applications. In some non-limiting embodiments or aspects, one or more of the steps of process 300 for data-driven optimization of onboard data collection is performed (e.g., completely, partially, and/or the like) by AV 102 (e.g., on-board computing device 112, one or more devices of AV 102, information generated from and/or received from AV 102, etc.). In some non-limiting embodiments or aspects, one or more of the steps of process 300 may be performed (e.g., completely, partially, and/or the like) by, include communications from or receive information from one or more components or elements of AV system architecture 200 of FIG. 2, one or more processors of self-driving system of AV 102, or based on information received from autonomy systems (e.g., data related to an on-board autonomous vehicle system, data related to an on-board autonomous vehicle service provider, data related to a device of on-board autonomous vehicle system, data about an on-board vehicle service, data related to an on-board vehicle controller or software program, data related to a sensor of an on-board vehicle system, or diagnostic information about any of the above identified systems, and/or the like.)

As shown in FIG. 3, at step 302, process 300 may include identifying a condition in a roadway associated with an operation of one or more AVs that may be further optimized to improve performance of the one or more AVs. In some non-limiting embodiments or aspects, for example, remote computing device 120 (e.g., one or more processors of remote computing device 120, one or more components of remote computing device 120, one or more applications of remote computing device 120, one or more models of remote computing device 120, one or more inference engines of remote computing device 120, etc.) identifies a condition in a roadway associated with an operation of one or more AVs that may be further optimized to improve performance of the one or more AVs.

In some non-limiting embodiments or aspects, remote computing device 120 identifies a condition in a roadway associated with an operation of one or more AVs that may be further optimized to improve performance of the one or more AVs. For example, identifying a condition includes using images (e.g., data coming from a camera, a LIDAR, a Radar, any sensor on an AV, any sensor in the roadway, etc.) to determine where and when (e.g., what city, road segment identifier, hour of day, season, weather, objects present, etc.) to perform onboard mining of images (e.g., logging, collecting, etc.) with higher frequency or a specific frequency, based on what is happening normally in the wild. In such an example, the methodology is not constrained only to lane segments and time of day, and one of skill in the art would apply it to any independent variable or factor which to use as a proxy to mine more of that situation, especially when AV 102 has difficulty or lacks capability to detect that situation itself. For example, a GPS could be used to indicate a point and information can be collected in a radius around that area.

Data driven approach involves obtaining the data from other sources of information and using it to find places, locations, times, etc. that should be logged. In this way, data can be collected and used to more efficiently improve operations (e.g., actions, navigation, algorithms, etc.) as described herein. As an example, collection triggers (e.g., configuration communications, etc.) can be sent to the one or more AVs, and automatically configured in the car, such that samples can be automatically collected and logged. For example, when AV 102 senses the condition in the roadway is determined to be present by determining target information (e.g., a roadway, a road segment, a time, etc.), and the target information includes parameters for at least one of a place, a location, a time, and/or the like for controlling logging information when the condition in the roadway is predicted to be present. AV 102, in response to receiving the one or more condition capture instructions, captures images (e.g., information or data from a camera, a LiDAR, a Radar, any sensor of an AV, any sensor operating in the roadway, or about any of these sources, etc.). Alternatively, remote computing device 120, in response to receiving information from AV 102, confirming a position in a trigger area, causes AV 102 to capture the sensor information. In some non-limiting embodiments or aspects, the condition in the roadway is determined to be present by determining based on one or more objects identified in information previously collected that the condition in the roadway is also identified. In some non-limiting embodiments or aspects, configuration communications can be made to one or more of the AVs to remove a trigger or change it based on data discovered by remote computing device 120.

Remote computing device 120 may identify a condition in a roadway from map data and sensor data (e.g., LiDAR data, AV sensor information, camera data, image data from or about images, etc.) that includes a condition associated with a road or an object in proximity to a road (e.g., a building, a lamppost, a crosswalk, a curb of the road, etc.), a condition associated with a lane of a roadway (e.g., the location and/or direction of a travel lane, a parking lane, a turning lane, a bicycle lane, etc.), a condition associated with traffic control of a road (e.g., the location of and/or instructions associated with lane markings, traffic signs, traffic lights, etc.), a condition associated with one or more routes (e.g., a nominal route, a driving route, etc.) that include one or more roadways, a condition associated with map data (e.g., Google maps, OSM, Tiger flies (e.g., geospatial data, map data, etc.) in the geographic location of the AV, a condition associated with LiDAR point cloud data that represents objects in the roadway, such as, other vehicles, pedestrians, cones, debris, and/or the like.

Remote computing device 120 may identify a condition associated with a sidewalk in proximity to (e.g., adjacent, near, next to, abutting, touching, etc.) the roadway, a condition associated with a physical barrier or by separation, a condition associated with a travel lane (e.g., a lane upon which a vehicle travels, a traffic lane, etc.), a parking lane (e.g., a lane in which a vehicle parks), a turning lane (e.g., a lane in which a vehicle turns from), one or more lanes in which a pedestrian, a bicycle, or other vehicle may travel, such as, a crosswalk, a bicycle lane (e.g., a lane in which a bicycle travels), a mass transit lane (e.g., a lane in which a bus may travel), a condition associated with a road edge of a road (e.g., a location of a road edge of a road, a distance of location from a road edge of a road, an indication whether a location is within a road edge of a road, etc.), a condition associated with an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.).

In some non-limiting embodiments or aspects, remote computing device 120 may identify a condition associated with one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, a condition associated with dense traffic, where successfully completing a lane change may require a complex maneuver, like speeding up, slowing down, stopping, or abruptly turning, for example, to steer into an open space between vehicles, pedestrians, or other objects (as detailed herein) in a destination lane, a condition associated with a lane split, an intersection (e.g., a three-leg, a four-leg, a multi-leg, a roundabout, a T-junction, a Y-intersection, a traffic circle, a fork, turning lanes, a split intersection, a town center intersection, etc.), a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane from which a vehicle turns, etc.), merging lanes (e.g., two lanes merging to one lane, one lane ends and merges into a new lane to continue, etc.), a condition associated with a traffic speed of objects in the roadway, a condition associated with current traffic direction (e.g., anti-routing traffic, wrong-way driving, or counter flow driving, where a vehicle is driving against the direction of traffic and/or against the legal flow of traffic), a condition associated with accidents or other incidents in the roadway, weather conditions in the geographic area (e.g., rain, fog, hail, sleet, ice, snow, etc.), or road construction projects.

In some non-limiting embodiments or aspects, remote computing device 120 may identify a condition associated with an object to avoid in proximity to a road, such as, structures (e.g., a building, a rest stop, a toll booth, a bridge, etc.), traffic control objects (e.g., lane markings, traffic signs, traffic lights, lampposts, curbs of the road, gully, a pipeline, an aqueduct, a speedbump, a speed depression, etc.), a lane of a roadway (e.g., a parking lane, a turning lane, a bicycle lane, etc.), a crosswalk, a mass transit lane (e.g., a travel lane in which a bus, a train, a light rail, and/or the like may travel), objects in proximity to and/or within a road (e.g., a parked vehicle, a double parked vehicle, vegetation, a lamppost, signage, a traffic sign, a bicycle, a railway track, a hazardous object, etc.), a sidewalk of a road, and/or the like.

In some non-limiting embodiments or aspects, the condition in the roadway is associated with an operation of one or more AVs that may be further optimized to improve performance of the one or more AVs. For example, the condition in the roadway is identified so that further information can be collected that is related to the condition. In such an example, the one or more AVs can be configured with instructions to collect further information that can be used to improve autonomy. As an example, perception algorithms (e.g., deep neural networks, etc.) may not perform well for collecting data for a school bus or in/around tunnels. In this example, it is necessary to obtain more images with school buses or in/around tunnels i.e. be able to say where (i.e., which roadways, lane segments) and/or when (i.e., what time of day, what period of the day 7-8 am, etc.) to log more images (e.g., by increasing the frequency of collection of these necessary images including school buses or tunnels, etc.) with the goal of finding more images in an efficient way (e.g., without increasing logging or storing capacity on the AV). In another example, an operation of the one or more AVs that may be further optimized to improve performance includes at least one of detection (e.g., finding out where an object is exactly in the environment surrounding the one or more AVs), classification (e.g., determining what exactly an object is), tracking (e.g., observing the moving objects in the environment, such as other vehicles, pedestrians, etc. as described above), segmentation (e.g., matching each pixel in an image with a schematic category, such as a road, sky, other vehicles, etc.).

In some non-limiting embodiments or aspects, remote computing device 120 or AV 102 determines a time to collect data at a roadway. For example, if a time period is relevant, condition configuration instructions include an identifying time segment to track the one or more roadways.

In some non-limiting embodiments or aspects, to identify target roadways (and time of day) where AV 102 should mine for a condition (e.g., a specific class or situation) historical data can be used. For example, historical data may include previous lane traversals of AV 102 (e.g., on a roadway including lane segment globally unique identifier ("GUID")). Historical data may also include information (e.g., classifications, locations, etc.) from human labeled images that were collected based on an onboard random mining strategy (e.g., data collected whenever a random time trigger is generated, etc.). Another source of information can be data that has been collected in diverse ways and has passed through a classifier (e.g., contrastive language-image pre-training (CLIP) including approximately 1.5 million annotated images). CLIP pre-trains an image encoder and a text encoder to predict which images were paired with which texts in a dataset. This behavior information is then used to turn CLIP into a zero-shot classifier (e.g., a machine learning where a pre-trained deep learning model is configured to generalize on a novel category of samples) where the training and testing set classes are disjoint, such that a model trained to distinguish between images of cars and trucks is made to identify images of school busses, etc. The classes covered by the training instances are referred to as the "seen" classes, while the unlabeled training instances are referred to as the "unseen" classes. In such an example, each of a dataset's classes are converted into captions such as "a photo of a school bus" and predict the class of the caption by estimating best pairs within a given image. Historical data also includes prediction data logged in the one or more AVs (e.g., one or more testing AVs performing a test route, etc.). In some non-limiting embodiments or aspects, other sources can be used as well, such as mapping with open source OSM map data to identify tunnels or confirm a plausible result.

In some non-limiting embodiments or aspects, remote computing device 120 determines for each roadway (e.g., road segment GUID, lane segment GUID, etc.) the lane traversals. In such an example, remote computing device 120 determines information with respect to meters and minutes traversed for each roadway when determining (or after determining) the lane traversals. Each image includes at least one of associated human labels (e.g., 10 cars, 5 pedestrians, 3 animals, etc.), associated CLIP annotations (e.g. "driving in tunnel"), and/or the like. The prediction data includes information such as the number of pedestrians or vehicles at specified time stamps.

In some non-limiting embodiments or aspects, remote computing device 120 may associate, after determining the lane traversals, the image timestamp (or the prediction message timestamp) with the start and the end time of the traversal. Based on this information, remote computing device 120 calculates objects/meters:

and objects/minute per segment:

In this way, the results are normalized by figuring out how many miles (objects/meters) or how many minutes (objects/minute). In such an example, the data depends not just on how many objects, conditions, situations, and/or the like reported, but also on how many miles have been traversed during the collection. Thus, if only 5 objects are observed in a roadway, but the roadway has been traversed only once (e.g., along a mile of road, etc.), this is preferred over a collection that has also seen 5 objects on another segment, but has been traversed multiple times (e.g., many times, etc.). This can provide a metric to consider for determining a confidence and can be associated with a higher probability of finding the object in the first segment.

Returning to FIG. 3, at step 304, process 300 may include generating condition capture instructions to communicate, to the one or more AVs 102, one or more parameters of a storage request in one or more roadways predicted to exhibit the condition in the roadway. In some non-limiting embodiments or aspects, for example, AV 102 (e.g., one or more processors of AV 102, one or more components of AV 102, one or more applications of AV 102, one or more sensors of AV 102, one or more processors of on-board computing device 112, one or more processors of remote computing device 120, etc.) receives condition capture instructions communicating one or more parameters of a storage request in one or more roadways predicted to exhibit the condition in the roadway. In some non-limiting embodiments or aspects, remote computing device 120 generates and sends condition capture instructions to one or more AVs 102, including at least the one or more parameters of a storage request in one or more roadways predicted to exhibit the condition in the roadway.

In some non-limiting embodiments or aspects, remote computing device 120 generates one or more condition capture instructions to communicate to the one or more AVs. In such an example, the one or more condition capture instructions comprise one or more parameters of a storage request in one or more roadways predicted to exhibit the condition in the roadway. For example, the instruction may be configured to cause AV 102 to collect condition information (e.g., images, sensor data, LiDAR sweeps, or other sensor information, that is collected in a roadway which is determined to or may exhibit a condition in the roadway, exhibit a condition in the roadway at a predetermined time, exhibit a condition in a particular roadway, and/or the like) in the roadway at a time when the condition is predicted to be present in the roadway (e.g., a time when the condition has been previously determined in the roadway, a location where the condition has been previously determined in the roadway, a radius of a geographic location where the condition has been previously determined in the roadway, etc.).

In some non-limiting embodiments or aspects, one or more parameters of a storage request include information for identifying a precise location that the condition in the roadway can be found. For example, the description of FIGS. 4 and 5 herein include examples of one or more parameters of a storage request in one or more roadways predicted to exhibit the condition in the roadway, including time of day, roadway identifiers (e.g., segment ids, etc.), a radius where one should mine with a higher frequency, a lane within a distance of a landmark or other identifiable parcel of land, associated with a natural resource, a business park, within proximity of transport, such as an airport, a bus station or other district of a city, and/or the like.

In some non-limiting embodiments or aspects, the condition in the roadway includes a situation, such as a naturally occurring situation in and around a roadway that may affect one or more operations of AV 102 (e.g., execution, movement, or actions in AV 102). In such an example, at least one signal, factor, or object serves as a proxy for the naturally occurring condition. In such an example, the remote computing device 120 mines (e.g., finds or stores) a plurality of roadway images from one or more data sources for factors relating to (or matching) to the condition.

In some non-limiting embodiments or aspects, after remote computing device 120 mines (e.g., finds, searches, stores, etc.) a plurality of roadway images from the one or more data sources for factors relating to or matching a reoccurring situation in the roadway, it associates the plurality of roadway images as one or more other roadways to traverse based on location and time. For example, the reoccurring situation is identified and attached to the one or more other roadways to traverse based on the previous plurality of roadway images that included factors that were used to make the attachment. Still further, the remote computing device 120 generates a configuration file with the one or more condition capture instructions for an AV to collect information based on a factor relating to or matching a reoccurring situation.

In such an example, remote computing device 120 collects a plurality of roadway images from the roadway based on the configuration file. The configuration file includes information for collecting images when encountering factors in the roadway relating to or matching a reoccurring situation.

In some non-limiting embodiments or aspects, remote computing device 120 generates a confidence interval. For example, remote computing device 120 generates a confidence interval for a considered metric to identify at least one of the one or more road segments which exhibits the condition in the roadway. In such an example, remote computing device 120 generates the confidence interval based on a specific metric (e.g. objects/meter, segments/meter, detections/meter, AV actions/meter, etc.) to be identified in each road segment. Then this confidence interval of the specific metric can be used to determine which road segments to collect in the roadway (e.g., logging in a road segment exhibiting the specific condition, logging a road segment determined to have a sufficiently narrow confidence interval with respect to exhibiting the specific condition that is being searched, operating the AV based on a configuration instruction (e.g., a storage request, etc.) for finding road segments exhibiting the specified condition, and/or the like). In one example, only segments with a confidence interval lower than a specific threshold (e.g., a target threshold) are used. In another example, the most traversed segments (e.g., the most school buses per meter on segment X, etc.) are used to determine which segments to include for a specific condition.

In some non-limiting embodiments or aspects, in response to determining that the confidence interval of a specific metric (e.g. objects/meter) for a road segment is very narrow, within a target threshold associated with the roadway, and/or the like, the particular road segment (e.g., roadway, etc.) is used. For example, in a scenario where collection of tunnel images are needed for improving a condition associated with traversing a tunnel, such as, for example, where the images can be very distorted by the introduction of light, images of tunnels in the roadway may be obtained for a particular road segment having a tunnel based on the metrics of the images of the particular road segment falling within a specific target range or a narrow target range. As an example, remote computing device 120 may configure AV 102 to capture images of the tunnel for the particular road segment by sending a storage request (e.g., a collection instruction to configure at least one AV, etc.) to AV 102 instructing to collect additional tunnel images based on the particular road segment being in the specific target range. In such an example, with logged images for observing tunnels, the perception model can be improved, and in turn, the perception of AV 102 can be improved for the conditions, such as when entering and exiting a tunnel (e.g., the improvement can be universal for all tunnels, or can be particular to a specific tunnel, etc.).

In some non-limiting embodiments or aspects, in response to determining that the confidence interval of the metric of a road segment is within a target threshold, the one or more AVs 102 are controlled to collect information on that road segment that can be used (e.g., used immediately, used later, used to update autonomy software, etc.) to improve at least one AV operation. For example, based on a confidence interval calculated for a specific metric of a segment, information is collected at the time when the condition in the roadway is present. In other examples, in response to determining that the confidence interval of a metric of a road segment is too broad (e.g., outside a threshold range associated with the roadway, etc.), the road segment is not used in the storage request.

In some non-limiting embodiments or aspects, a confidence interval (i.e. an upper and lower bound of the confidence interval) is calculated with respect to the metric (e.g., objects/meters, objects/minute, and/or the like) for a roadway segment to determine which roadway segment to select with confidence.

In some non-limiting embodiments or aspects, remote computing device 120 sorts one or more roadway segments using the confidence interval (e.g., takes only a top number of segments, or alternatively, takes only the road segments which have a narrow confidence interval, such as those where a larger number is attributed to this area, those with a narrow confidence interval, those where an event is expected to be happening (e.g., more often than other areas, etc.) and/or the like.)

In some non-limiting embodiments or aspects, depending on the use case, an identified list of road segments (and their predecessors and successors) are used for mining (e.g., in the case of static situations such as tunnels, see example below).

In a different example, clustering can provide different segments, from which a clustering of identified segments can be selected, such that AV 102 collects condition information based on the cluster centroid segment and a radius of X Km/miles for mining of a specific situation or class (see FIG. 5B below for OFFICIAL SIGNALLER example).

In some non-limiting embodiments or aspects, depending on the logging capacity, remote computing device 120 may decide on having segments where a high probability of occurrence of multiple conditions (e.g., classes, states, situations, etc.) can be found (e.g., trucks or busses exiting and entering tunnels, two or more different traffic signs positioned together, traffic officer in roadway near school, etc.). In this case, a weighted sum of the previously calculated metrics is applied (e.g., where coefficients can be weighted appropriately), where a weighting of 0.5 is provided if both conditions (e.g., classes, a state of the roadway, situation, etc.) are equally important. In such an example, the weighting can be adjusted to control a condition where one situation is more important:

$$\frac{\text{class}_{k,j}}{\text{meters}_{seg_i}} = \omega_k * \frac{\text{class}_k}{\text{minutes}_{seg_i}} + \omega_j * \frac{\text{class}_j}{\text{minutes}_{seg_i}}$$

The approach can be also be extended to include the hour of the day when a specific situation or object class is to be expected with higher frequency e.g. school crossing guard is to be expected more frequently in the morning (i.e., 8 am-9 am) and early afternoons (i.e., 2 pm-3 pm) reflecting the operating hours of the schools. Even further, one could specify days of the week (i.e., school crossing guard is to occur more frequently Monday-Friday).

After the information (i.e. segments and/or hours) is identified by the methodology, a configuration file (e.g., a serialization file, a YAML Ain't a Markup Language file ("YAML"), etc.) may be deployed in the car.

Again with reference to FIG. 3, at step 306, process 300 may include collecting condition information in the roadway at a time when the condition is predicted to be present in the roadway. For example, in some non-limiting embodiments or aspects, AV 102 collects condition information in the roadway at a time when the condition is predicted to be present in the roadway. In some examples, AV 102, in response to receiving at least one instruction in the one or more condition capture instructions, collects condition information in the roadway at a time when the condition is predicted to be present in the roadway.

As shown in FIG. 3, at step 308, process 300 may include controlling at least one AV during navigation of the condition in another roadway after optimizing the operation of the at least one AV based on the condition information previously collected. In some non-limiting embodiments or aspects, for example, AV 102 (e.g., one or more processors of AV 102, one or more components of AV 102, one or more applications of AV 102, one or more sensors of AV 102, one or more processors of on-board computing device 112, etc.) controls at least one AV during navigation of the condition in another roadway after optimizing the operation of the at least one AV based on the condition information previously collected.

In some non-limiting embodiments or aspects, remote computing device 120, as a fleet controller (e.g., remote computing device 120, a cloud computer, a lead AV, etc.) of one or more AVs 102, sends a configuration to an AV (e.g., any AV in the fleet, each AV in the fleet, a first AV, a second AV, etc.) with instructions to avoid logging such images again. For example, a configuration instruction can be automatically sent based on the position of the AV with respect to a condition in the roadway in need of logging.

In another example, fleet controller sends messages to multiple AVs 102 for logging. For example, remote computing device 120 predicts a time or location when a first AV 102 may traverse a roadway having an observable condition. In some non-limiting embodiments or aspects, remote computing device 120 predicts a time or location when a second AV 102 may traverse a roadway having an observable condition related to at least one of a place, location, or time that should be logged. In this example, roadway information from one or more sources of information that are related to at least one of the condition in the roadway or the operation of the one or more AVs in the roadway are matched to the observable condition related to at least one of a place, location, or time that should be logged. In such an example, remote computing device 120 sends an instruction to the first AV 102, the second AV 102, or both to cause at least one of the one or more AVs 102 to store information for a specified place, location, or time, based on an operation matching roadway information from the one or more sources of information that are related to the at least one of the condition in the roadway. In such an example, the condition configuration instructions are activated in the first AV 102 or the second AV 102 to log information of the roadway in an environment surrounding the AV.

Figure 6:
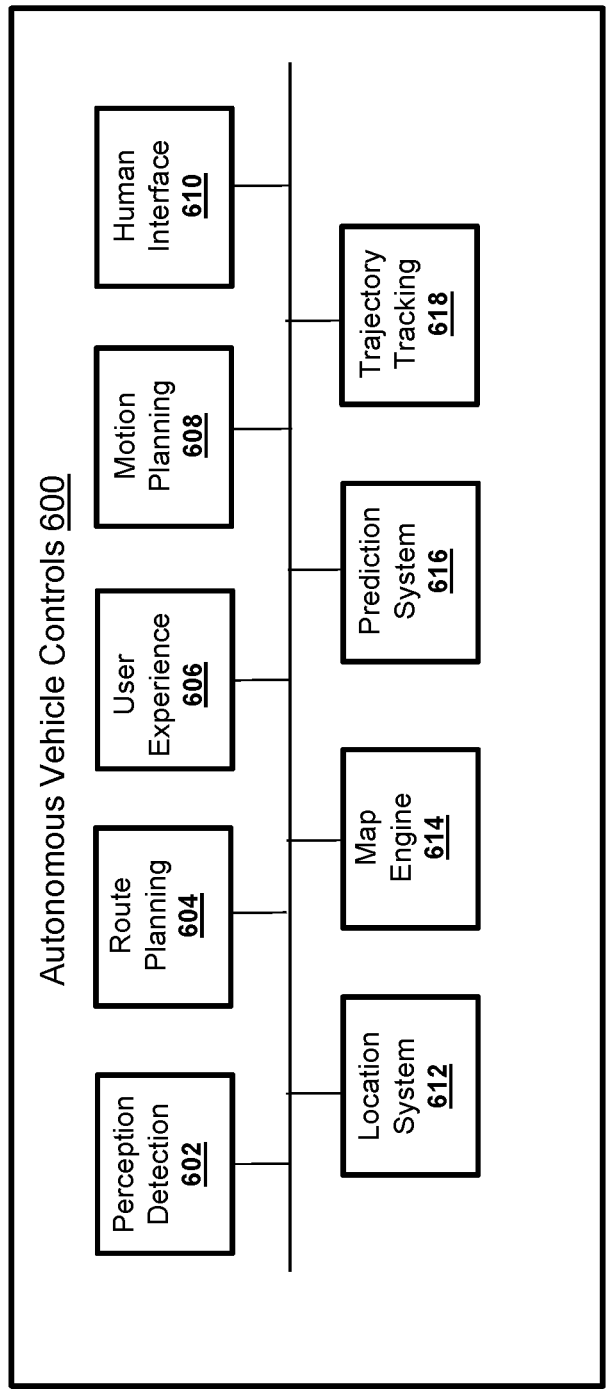
FIG. 6 provides a diagram of non-limiting embodiments or aspects of autonomous vehicle controls in which data-driven optimization of onboard data collection, as described herein, may be implemented to protect communications.

In some non-limiting embodiments or aspects, the fleet manager determines a threshold number of AVs that have previously collected information about the specified place, location, or time. For example, the threshold may indicate a number of images needed to improve an operation of the autonomy system, as shown in FIG. 6. In this example, after determining the threshold is met, fleet manager sends an instruction to a fleet of AVs to cause each of the one or more AVs of the fleet of AVs to stop logging information for the specified place, location, time, or combinations thereof. In such an example, the fleet of AVs 102 has already collected 500 scenes of a tunnel, the AV controller (e.g., remote computing device 120, etc.) can be programmed or configured to send a communication to other AVs in the fleet (e.g., AVs three and four, etc.) with condition instructions to not collect such information because AVs one and two have already collected the information. In other examples, if an AV is determined to be nearly full with regard to storage, the AV can be configured to immediately stop collecting, and only receive collection instructions that are of a critical nature, not receive instructions unless critical, or ignore such instructions unless instructions are received otherwise using the data-driven approach to obtain the data from other sources (e.g., in the AV) for information about specified places, locations, or times that should be logged.

In some non-limiting embodiments or aspects, remote computing device 120 sends an instruction to cause each of the one or more AVs 102 to log information at a place, location, or time and at least one of the one or more AVs 102 records at least one of AV data, AV information, or AV sensor data. In such an example, the optimizing includes more efficiently performing operations. For example, the optimized operation may include obtaining a specified number of images, obtaining a number of images to perform a specific process, or obtaining a number of images to update an inference engine. In addition, the optimized operation may be related to a process in AV 102 that becomes more efficient based on obtaining a specified number of images, obtaining a number of images to perform a specific process, or obtaining a number of images to update an inference engine. For example, the process in AV 102 may be an algorithm, script, computer instructions or other code, that has been optimized based on the efficient obtaining of a specified number of images, obtaining of a number of images to perform a specific process, or obtaining of a number of images to update an inference engine.

In some non-limiting embodiments or aspects, the onboard data collection is optimized by eliminating or decreasing processing (e.g., processing cycles, etc.) for at least one of logging, review, or analysis of objects. The logging is more efficient at least for the reason that logging only images that improve an area of knowledge related to the autonomous systems, contributes to labeling only things that are interesting or useful for the AV 102, contributes to perception of objects in an environment surrounding the AV 102, and/or the like. In such an example, the logging is also more efficient because collections may be eliminated, such as collections of random data that do not include information for optimizing an operation associated with AV 102, or collecting continually, which also returns a great deal of useless information, and is difficult in forming a search strategy as the contents are largely unknown unless manual intervention is performed.

In some non-limiting embodiments or aspects, the logging is more efficient because roadway information is obtained for a first roadway determined to be more likely to exhibit the condition than other roadways of the one or more roadways that have a similar condition.

FIG. 4 illustrates exemplary AV roadway traversals 400 where collection of traversals are output for optimization. As shown, for each map segment GUID, lane traversals include information for meters and minutes traversed (e.g., sum of a traversed distance, sum of a travel time in minutes, etc.). In addition, the table includes a number of traversals, and a summary of the images for each segment GUID, including summary data (sum of the number of school vehicles with active stop signals, etc.) formed from image information for 1) associated human labels e.g. 10 cars, 5 pedestrians, 3 animals, and/or the like, or 2) associated CLIP annotation e.g. "driving in tunnel". The prediction data includes information such as the number of pedestrians or vehicles at specific time stamps. This is used to associate the image timestamp or the prediction message timestamp with the start and the end time of the traversal. Based on this information, objects/meters, objects/minute per segment or objects per 100 k minutes or objects per 100 k meters are determined using the equations above.

Figure 5A:
FIGS. 5A-5C illustrate non-limiting embodiments or aspects of a roadway environment in which systems, apparatuses, and/or methods, of data-driven optimization of onboard data collection as described herein, may be implemented.

FIG. 5A illustrates an exemplary AV driving application 500A where collection of condition information is provided by data-driven optimization of onboard data collection. In some non-limiting embodiments or aspects, AV roadway traversals 400 includes a scenario for collecting information while driving around tunnels and under bridges. In some examples, the source of information includes CLIP images identified in a CLIP string search using search terms (e.g., "driving under bridge", "driving in tunnel").

In such an example, remote computing device 120 obtains the top 1500 images for each search string. Plausibilisation is performed using a third party map provider (e.g. google maps) to determine whether the data seems likely or possible to believe (e.g. cross checking with 3rd party satellite images if the data can be believed, etc.). In such an example, the determined action for onboard mining is to use a set of segment identifiers in and around tunnels or bridges. For example, segment identifiers determined to be in a bridge or on a tunnel, and including predecessor and successor segments (e.g., entering and exiting the tunnel or bridge).

After the data-driven optimization of onboard data collection, condition information (i.e., based on segments, hours, etc.) is identified, and the remote computing device 120 generates configuration files (e.g. using a digestible data serialization language to create configuration files with any programming language, such as YAML) that can be deployed in AV 102 to capture the condition information, shown below:

```
mining_rule_1:
    shadow_mode:
    false
    max_num_events:
    5000
    event_tags: [#driving_in_tunnel]
    logging_requests:         [raw_image_front_center,
    raw_image_front_left ...] triggered_by: [segment_guids]
    conditions:
        segment_guids:    [a5b62391-c190-40dc-ad54-d19a662c9ae9,....
                          9aec1156-6158-4251-a9aa-bd9e365ded37]
```

In such an example, mining_rule_1 includes instructions for AV 102 to perform 5,000 events while driving in a tunnel. The logging requests of remote computing device 120 are made to AV 102. The logging devices include those listed, such as a raw image from the front center (e.g., raw_image_front_center) and a raw image from the front left (e.g., raw_image_front_left). In this case, the trigger is the segment GUIDs listed. Thus, when the car enters an identified GUID, AV 102 starts collecting information using the devices listed under logging requests. In some non-limiting embodiments or aspects, the mining rule may also include instructions for collecting images on bridges.

Indication of the condition is provided using numbers, higher numbers indicating narrower confidence intervals (i.e., have seen more of data related to the example) that AV 102 has traversed the condition, tunnel, bridge, and/or the like.

In some non-limiting embodiments or aspects, with reference to table 5A below, remote computing device 120 suggests using a set of segment ids and/or a radius where one should mine with a higher frequency for onboard mining:

| Cluster Number | N Segments in Cluster |
| --- | --- |
| 1 | 6 |
| 4 | 4 |
| 2 | 3 |
| 0 | 3 |
| 3 | 1 |
| 5 | 1 |

For example, in table 5A, only the top 2 clusters are used. As shown, the cluster number 1 includes 6 segments, and cluster number 4 includes 4 segments.

Figure 5B:
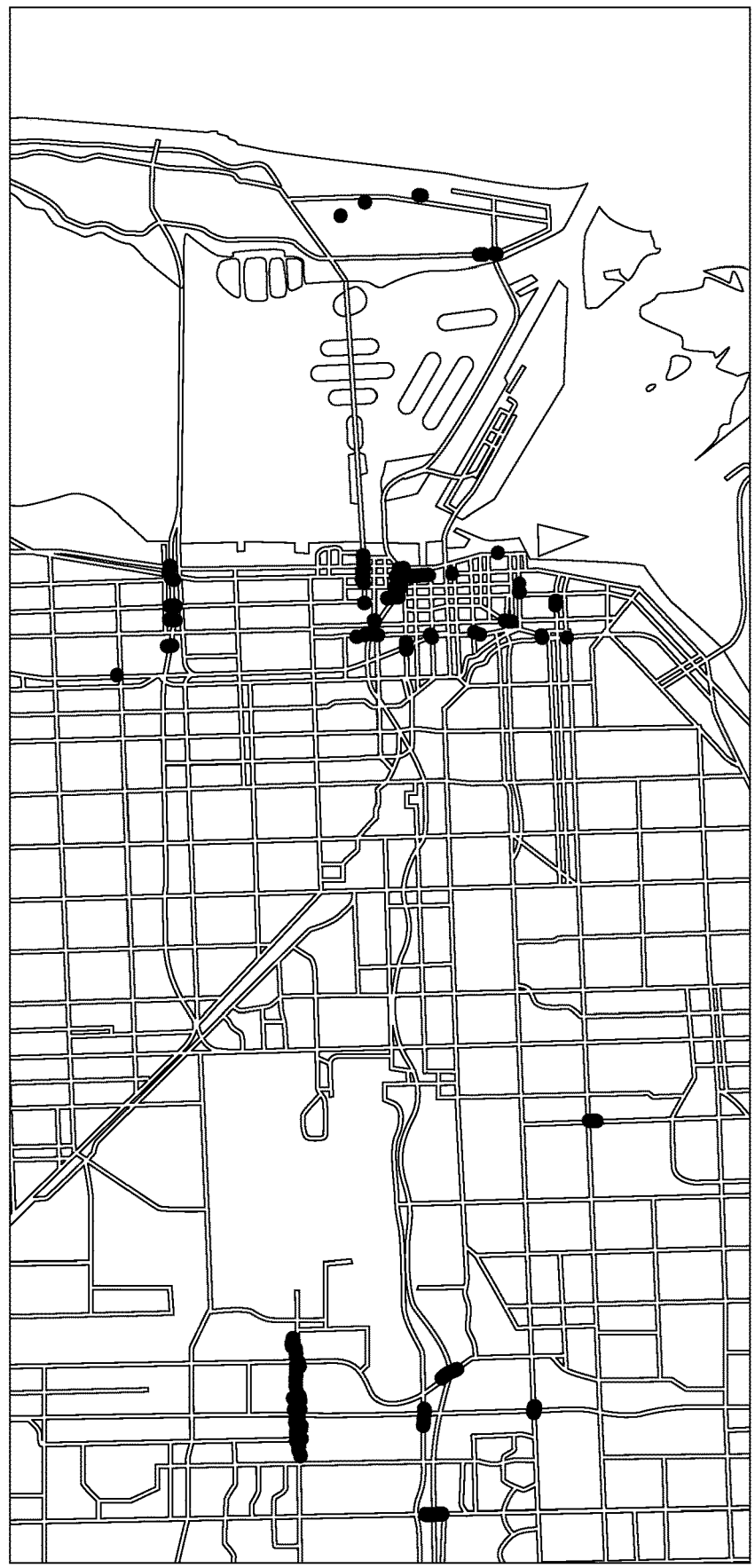

FIG. 5B illustrates an exemplary AV driving application 500B where collection of condition information is provided by data-driven optimization of onboard data collection. In some non-limiting embodiments or aspects, AV roadway traversals 400 includes a scenario for collecting information showing an official signaler. In some examples, the source of information includes historically random mined images which have been labeled and/or annotated and a string search using search terms (e.g., "construction worker holding traffic sign", "school crossing guards", "police officer").

In such an example, remote computing device 120 obtains 4000 images for each search string. In such an example, the determined action for onboard mining is to use a set of segment identifiers (e.g., roadway identifiers, road segment identifiers, etc.) and a radius of 2 kilometers surrounding the identified segment identifier (e.g., a center segment GUID, etc.). For example, this example is triggered when AV 102 traverses a roadway (e.g., roadway with the identified segment identifier) determined to be within a radius of 2 kilometers (e.g., entering and exiting the tunnel or bridge).

After the data-driven optimization of onboard data collection, condition information (i.e., segments and/or hours are identified by the methodology) guides the remote computing device 120 to generate a configuration file (e.g. using a digestible data serialization language to create configuration files with any programming language, such as YAML) that can be deployed in AV 102, shown below:

```
mining_rule_2:
  shadow_mode:
  false
  max_num_events
  : 4000
  event_tags: [#offficial_signaller]
  logging_requests: [raw_image_front_center,
  raw_image_front_left] triggered_by: [center_segment_guid,
  radius]
  conditions:
center_segment_guid: [d7d7717d-3a47-493e-a2aa-4bec0776e1d2] radius:
[2] # 2km radius
```

In such an example, mining_rule_2 for an official signaler includes instructions for AV 102 to perform 4,000 events while traversing an area around the roadway (e.g., such as collect a raw image from the front center (e.g., raw_image_front_center) and collect a raw image from the front left (e.g., raw_image_front_left). The logging requests of remote computing device 120 are made to AV 102. The logging devices include those listed, such as a raw image from the front center (e.g., raw_image_front_center) and a raw image from the front left (e.g., raw_image_front_left). In such a case, the trigger is the segment GUIDs listed. Thus, when the car enters an area within 2 kilometers of the identified GUID, AV 102 starts collecting information using the devices listed under logging requests. In some non-limiting embodiments or aspects, the mining rule may also include instructions for collecting images of construction workers holding traffic signs, school crossing guards, or police officers.

Indication is provided using numbers, higher numbers indicating narrower confidence intervals (i.e., we have seen more of data related to the example) and we have traversed the example (e.g., condition, tunnel, bridge, etc.) more often (i.e., spent more driving time on the segment).

In some non-limiting embodiments or aspects, remote computing device 120 suggests using a set of segment ids and/or a radius where one should mine with a higher frequency for onboard mining.

Figure 5C:
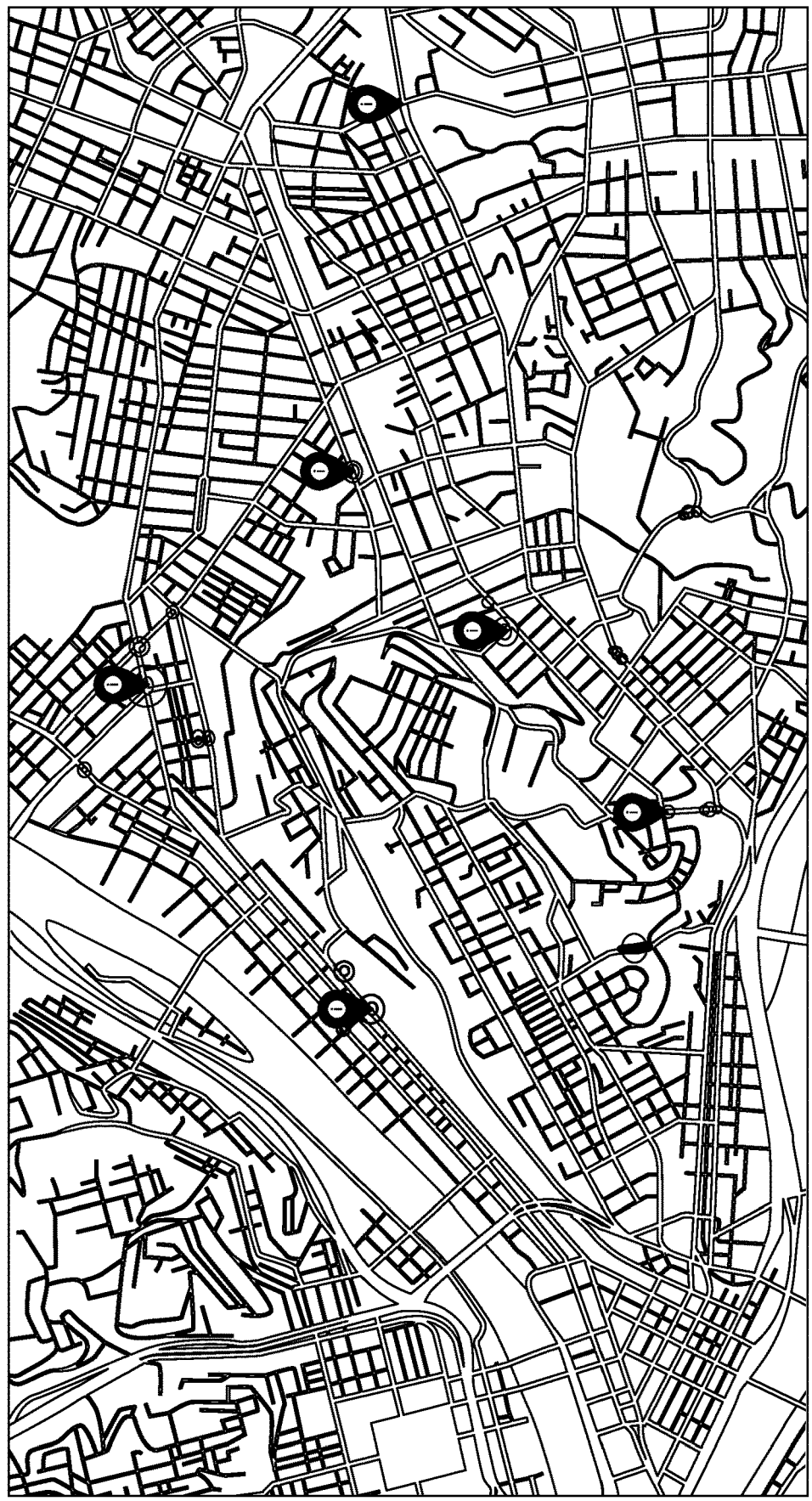

FIG. 5C illustrates an exemplary AV driving application 500C where collection of condition information is provided by data-driven optimization of onboard data collection. In some non-limiting embodiments or aspects, AV driving application 500C includes a scenario for collecting information showing an active school bus (i.e., all the lights flashing). In some examples, the source of information includes prediction inference data for a school bus with active stop signals.

In such an example, remote computing device 120 obtains 500 images for each search string. In such an example, the determined action for onboard mining is to use segment identifiers (e.g., lane segment GUID, center segment GUID, etc.), a radius of 1 kilometer surrounding the identified segment identifier (e.g., a segment GUID, etc.) and a time signal (e.g., hours: [(8, 9), (14, 15)]). For example, this example is triggered when AV 102 traverses a roadway determined to be within a radius of 1 kilometer of the identified segment identifier during hours shown, for example between 8 and 9, or between 14 and 15, shown below:

```
mining_rule_3
:
  shadow_mode
  : false
  max_num_eve
nts: 500
  event_tags: [#school crossing guard]
  logging_requests: [raw_image_front_center,
  raw_image_front_left] triggered_by:
  [center_segment_guid, radius, hours]
  conditions:
    center_segment_guid: [d7d7717d-3a47-493e-a2aa-
    4bec0776e1d2] radius: [1] # 1km radius
    hours: [ (8, 9), (14, 15)]
```

FIG. 6 illustrates an exemplary vehicle control system 600, in which devices, systems, and/or methods, described herein, may be implemented. Vehicle control system 600 may interconnect (e.g., establish a connection to communicate and/or the like) with on-board computing device 112, sensor system 110, user interface 116, or via communication interface 114 to remote data and processing systems (e.g., sources, computing devices, external computing systems, etc.) of database 122 (e.g., data store(s), etc.) and remote computing device 120 (e.g., central server(s), etc.), for example, vehicle control system 600 may utilize wired connections and/or wireless connections to provide an input or an output exchange with local vehicle systems (e.g., one or more systems of AV 102, etc.).

With continued reference to FIG. 6, vehicle control system 600 may, additionally or alternatively, communicate with components (e.g., shown in FIG. 2, etc.), such as, an engine, wheels, steering wheel, transmission, etc., which may be controlled, using a variety of communication signals and/or commands, such as, for example, acceleration signals or commands, deceleration signals or commands, steering signals or commands, braking signals or commands, and/or the like.

In some non-limiting embodiments or aspects, vehicle control system 600 includes components for autonomous operation of AV 102 to store or retrieve (e.g., request, receive, etc.) vehicle information from one or more data stores and/or one or more central servers. For example, vehicle control system 600 may synchronize (e.g., update, change, etc.) data, interfaces, map data, and/or the like as AV 102 is traversing a roadway. Multiple AVs may be coupled to each other and/or coupled to data stores, to central servers, or to one another.

With continued reference to FIG. 6, vehicle control system 600 may receive data and provide instructions from one or more components comprising perception detection 602, location system 612, route planning 604, map engine 614, user experience 606, prediction system 616, motion planning 608, trajectory tracking 618, and human interface 610.

Location system 612 may obtain and/or retrieve map data (e.g., map information, one or more submaps, one or more maps for a geographic area, etc.) from map engine 614 which provides detailed information about a surrounding environment of the autonomous vehicle. Location system 612 may obtain detailed information about the surrounding environment of the autonomous vehicle. The map data can provide information regarding: the identity or location of different roadways, road segments, buildings, trees, signs, or other objects; the location and direction of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data (as described above) that provides information and assists AV 102 in analyzing a surrounding environment of the autonomous vehicle. In some non-limiting embodiments or aspects, map data may also include reference path information corresponding to common patterns of vehicle travel along one or more lanes such that a motion of an object is constrained to the reference path (e.g., locations within traffic lanes on which an object commonly travels). Such reference paths may be pre-defined, such as, the centerline of the traffic lanes. Optionally, the reference path may be generated based on historical observations of vehicles or other objects over a period of time (e.g., reference paths for straight line travel, lane merge, a turn, or the like).

In some non-limiting embodiments or aspects, location system 612 may also include and/or may receive information relating to a trip or a route of a user, real-time traffic information on the route, and/or the like.

Location system 612 may also comprise and/or may communicate with route planning 604 for generating an AV navigation route from a start position to a destination position for AV cloud system. Route planning 604 may access map engine 614 (e.g., a central map data store stored in data pipeline) to identify possible routes and road segments where a vehicle may travel, to travel from a start position to a destination position. Route planning 604 may score the possible routes and identify a preferred route to reach the destination. For example, route planning 604 may generate a navigation route that minimizes a distance traveled or other cost function while traversing the route and may further access the traffic information and/or estimates that can affect an amount of time it will take to travel on a particular route. Depending on implementation, route planning 604 may generate one or more routes using various routing methods, such as, Dijkstra's algorithm, Bellman-Ford's algorithm, and/or the like. Route planning 604 may also use the traffic information to generate a navigation route which reflects an expected experience or condition of the route (e.g., current day of the week or current time of day, etc.), such that a route generated for travel during rush-hour may differ from a route generated for travel late at night. Route planning 604 may also generate more than one navigation route to a destination and send more than one of these navigation routes to user experience 606 for interfacing with a user (e.g., on a tablet, a mobile device, a vehicle device, etc.) for selection by a user from among various possible routes.

Perception detection 602 may detect information of the surrounding environment of AV 102 during travel from the start position to the destination along the preferred route, perception detection 602 may detect objects or other roadway characteristics based on sensor data provided by sensors (e.g., one or more detections, etc.) as shown and described with respect to FIG. 2, and information obtained by location system 612. The perception information represents what an ordinary driver perceives in the surrounding environment of a vehicle. The perception data may include information relating to one or more objects in the environment of the autonomous vehicle. For example, prediction system 616 may process sensor data (e.g., from LiDAR, RADAR, camera images, etc.) in order to identify objects and/or features in and around the geospatial area of the autonomous vehicle. Detected objects may include traffic signals, roadway boundaries, vehicles, pedestrians, obstacles in the roadway, and/or the like. Perception detection 602 may use known object recognition and detection algorithms, video tracking algorithms, or computer vision algorithms (e.g., tracking objects frame-to-frame iteratively over a number of time periods, etc.) to perceive an environment of AV 102.

In some non-limiting embodiments or aspects, perception detection 602 may also determine, for one or more identified objects in the environment, a current state of the object. The state information may include, without limitation, for each object: current location; current speed and/or acceleration; current heading; current orientation; size/footprint; type (e.g., vehicle vs. pedestrian vs. bicycle vs. static object or obstacle); and/or other state information.

Prediction system 616 may predict the future locations, trajectories, and/or actions of such objects perceived in the environment, based at least in part on perception information (e.g., the state data for each object) received from perception detection 602, the location information received from location system 612, sensor data, and/or any other data related to a past and/or a current state of an object, the autonomous vehicle, the surrounding environment, and/or relationship(s). For example, if an object is a vehicle and the current driving environment includes an intersection, prediction system 616 may predict whether the object will likely move straight forward or make a movement into a turn, in a direction of a crossing lane, and/or the like. If the perception data indicates that the intersection has no traffic light, prediction system 616 may also predict whether the vehicle may fully stop prior to entering the intersection. Such predictions may be made for a given time horizon (e.g., 5 seconds in the future). In certain embodiments, prediction system 616 may provide the predicted trajectory or trajectories for each object to motion planning 608.

Motion planning 608 determines a motion plan for AV 102 based on the perception data, prediction data, sensor data, location data, map data, and/or the like. Specifically, given predictions about the future locations of proximate objects and other perception data, motion planning 608 can determine a motion plan (e.g., a trajectory, candidate trajectories, etc.) for autonomously navigating a route relative to one or more objects in their present and future locations.

In some examples, motion planning 608 may receive one or more predictions from prediction system 616 and make a decision regarding how to handle one or more objects in the environment surrounding AV 102. For a particular object (e.g., a vehicle with a given speed, direction, turning angle, etc.), motion planning 608 determines whether to overtake, yield, stop, and/or pass, based on, for example, traffic conditions, location, state of the autonomous vehicle, and/or the like. In some non-limiting embodiments or aspects, for a given object, motion planning 608 may decide a course to handle the object and may determine one or more actions for responding to the presence of the object. For example, for a given object, motion planning 608 may decide to pass the object and then may determine whether to pass on the left side or right side of the object (including motion parameters, such as, speed and lane change decisions). Motion planning 608, in connection with trajectory tracking 618, may also assess a relationship between a detected object and AV 102 before determining a trajectory. Depending on the relationship (e.g., an assessment within an acceptable threshold, etc.), AV 102 may determine to avoid an object by navigating a defined vehicle trajectory and/or implementing one or more dynamically generated maneuvers performed in a pre-defined time period (e.g., N milliseconds) to compensate for the objects predicted motion. In some examples, vehicle control system 600 are used to generate appropriate control instructions for executing a maneuver (e.g., mildly slow down, accelerate, change lane, turn, etc.). In contrast, depending on a location of an object (e.g. a pose of the object in the roadway, etc.), AV 102 may be controlled to stop or change direction of travel.

Trajectory tracking 618 observes a trajectory (e.g., trajectory generation) for an autonomous vehicle while AV 102 is traversing a pre-defined route (e.g., a nominal route generated by route planning 604, etc.). The trajectory specifies a path for the autonomous vehicle, as well as, a velocity profile. AV 102 converts the trajectory into control instructions for AV 102, including but not limited to throttle/brake and steering wheel angle commands for the controls shown in FIG. 2. Trajectory generation includes decisions relating to lane changes, such as, without limitation, whether a lane change is required, where to perform a lane change, and when to perform a lane change. Specifically, one objective of motion planning 608 is to generate a trajectory for motion of the vehicle from a start position to a destination on the nominal route, taking into account the perception and prediction data.

Motion planning 608 may generate a trajectory by performing topological planning to generate a set of constraints for each of a plurality of topologically distinct classes of trajectories, optimizing a single candidate trajectory for each class, and/or scoring the candidate trajectories to select an optimal trajectory. Topological classes are distinguished by the discrete actions taken with respect to obstacles or restricted map areas. Specifically, all possible trajectories in a topologically distinct class perform the same action with respect to obstacles or restricted map areas. Obstacles may include, for example, static objects, such as, traffic cones and bollards, or other road users, such as, pedestrians, cyclists, and cars (e.g., moving cars, parked cars, double parked cars, etc.). Restricted map areas may include, for example, crosswalks and intersections. Discrete actions may include, for example, to stop before or proceed, to track ahead or behind, to pass on the left or right of an object, and/or the like.

Motion planning 608 determines or generates planning and control data regarding the n of the autonomous vehicle that is transmitted to vehicle control system 600, such as on-board computing device 112, or routing controller 261 for execution. AV 102, for example, utilizes a motion plan to control braking via a brake controller; direction via a steering controller; speed and acceleration via a throttle controller (in a gas-powered vehicle); or a motor speed controller (such as, a current level controller in an electric vehicle); a differential gear controller (in vehicles with transmissions); and/or other controls.

In the various embodiments discussed in this document, the description may state that the vehicle or a controller included in the vehicle may implement programming instructions that cause the controller to make decisions and use the decisions to control operations of one or more vehicle systems via the vehicle control system of the vehicle. However, the embodiments are not limited to this arrangement, as in various embodiments the analysis, decision making, and/or operational control may be handled in full or in part by other computing devices that are in electronic communication with the vehicle's on-board controller and/or vehicle control system. Examples of such other computing devices include an electronic device (such as, a smartphone) associated with a person who is riding in the vehicle, as well as, a remote server that is in electronic communication with the vehicle via a wireless network. The processor of any such device may perform the operations that will be discussed below.

Figure 7:
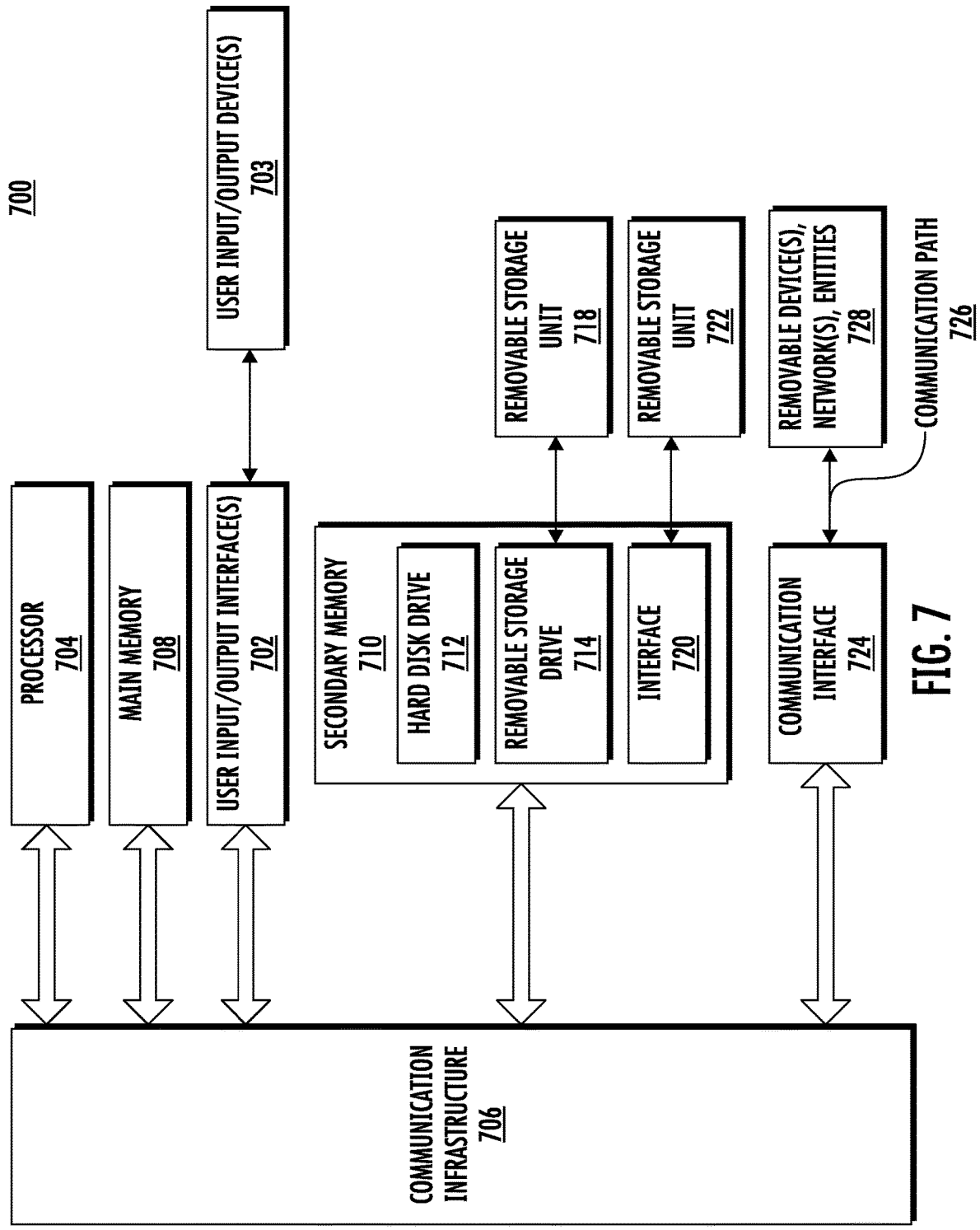
FIG. 7 provides non-limiting embodiments or aspects of exemplary computer systems in which systems, apparatuses, and/or methods, as described herein, may be implemented.

FIG. 7 illustrates a diagram of an exemplary computer system 700 in which various devices, systems, and/or methods, described herein, may be implemented. Computer system 700 can be any computer capable of performing the functions described herein.

Computer system 700 includes one or more processors (also called central processing units, or CPUs), such as processor 704. Processor 704 is connected to a communication infrastructure 706 (or bus).

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, and/or the like.

Computer system 700 also includes user input/output device(s) 603, such as monitors, keyboards, pointing devices, etc., that communicate with communication infrastructure 706 through user input/output interface(s) 702.

Computer system 700 also includes a main memory (or primary memory) 708, such as random access memory (RAM). Main memory 708 may include one or more levels of cache. Main memory 708 has stored therein control logic (i.e., computer software) and/or data.

Computer system 700 may also include one or more secondary storage devices or secondary memory 710. Secondary memory 710 may include, for example, hard disk drive 712 and/or removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with removable storage unit 718. Removable storage unit 718 includes a computer usable or readable storage device having stored thereon computer software (control logic) and/or data. Removable storage unit 718 may be a floppy disk, a magnetic tape, a compact disk, a DVD, an optical storage disk, and/or any other computer data storage device. Removable storage drive 714 reads from and/or writes to removable storage unit 718 in a well-known manner.

According to an exemplary embodiment, secondary memory 710 may include other means, instrumentalities, or other approaches for allowing computer programs and/or other instructions and/or data to be accessed by computer system 700. Such means, instrumentalities or other approaches may include, for example, removable storage unit 722 and interface 720. Examples of removable storage unit 722 and interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by remote device(s), network(s), or entity(s) 728). For example, communication interface 724 may allow computer system 700 to communicate with remote devices 728 over communication path 726, which may be wired and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for onboard data collection, comprising: identifying, by at least one processor, a condition in a roadway associated with an operation of one or more autonomous vehicles (AVs) that may be further optimized to improve performance of the one or more AVs, identifying the condition in the roadway further includes:

mining, by at least one processor, a plurality of roadway images from one or more data sources for factors relating to a reoccurring situation, as the condition, in the roadway; and associating, by the at least one processor, the plurality of roadway images with one or more other roadways to traverse based on location and time; and generating, by the at least one processor, one or more condition capture instructions to communicate to the one or more AVs, wherein the one or more condition capture instructions comprise one or more parameters of a storage request in one or more roadways predicted to exhibit the condition in the roadway, wherein, when at least one condition capture instruction in the one or more condition capture instructions are received by an AV computing system in at least one of the one or more AVs, the at least one condition capture instruction is configured to cause the at least one of the one or more AVs to collect condition information in the roadway at a time when the condition is predicted to be present in the roadway;

controlling at least one of the one or more AVs based on the one or more condition capture instructions.

2. The computer-implemented method of claim 1, wherein generating the one or more condition capture instructions comprises:

checking the confidence interval of a specific metric associated with the condition in the roadway to determine whether each of the one or more roadways is in a specific target range;

determining a confidence interval of a specific metric associated with the condition in the roadway is in a specific target range for at least one roadway of the one or more roadways; and in response to determining the confidence interval is within a specific target range for the at least one roadway, transmitting, to the at least one of the one or more AVs, an instruction in the one or more condition capture instructions to collect condition information in the at least one roadway.

3. The computer-implemented method of claim 1, wherein the condition in the roadway is determined to be present by determining target information based on one or more objects identified in information previously collected which also include the condition in the roadway, and the target information includes parameters for at least one of a place, a location, or a time, for controlling logging information when the condition in the roadway is predicted to be present.

4. The computer-implemented method of claim 1, further comprising:
determining a time or a location when a first AV of the one or more AVs may traverse a roadway having an observable condition;
determining a time or a location when a second AV of the one or more AVs may traverse a roadway having an observable condition related to at least one of a place, a location, or a time, that should be logged;
matching roadway information from one or more sources of information that are related to at least one of the condition in the roadway; and
sending an instruction to the one or more AVs to cause the first AV and the second AV to log information of the roadway in an environment surrounding each respective AV for a specified location at the time when the condition is predicted to be present in the roadway.

5. The computer-implemented method of claim 4, further comprising:
determining that a threshold number of AVs have previously collected information about the specified place, the location, or the time; and
sending an instruction to a fleet of AVs to cause each of the one or more AVs of the fleet of AVs to stop logging information for the specified place, the location, or the time.

6. The computer-implemented method of claim 1, wherein the condition in the roadway includes a naturally occurring situation in and around a roadway that may affect one or more operations of the at least one of the one or more AVs, execution, movement, or action, and
wherein at least one signal, factor, or object serves as a proxy for the naturally occurring condition.

7. The computer-implemented method of claim 1, wherein the onboard data collection is optimized by performing at least one of: obtaining a specified number of images, obtaining a number of images to perform a specific process, or obtaining a number of images to update an inference engine.

8. The computer-implemented method of claim 1, wherein the onboard data collection is optimized by eliminating or decreasing processing for logging, review, or analysis of objects,
wherein logging comprises eliminating extra logging by logging based on AV mining of: images that improve perception of autonomous systems or contribute to solving problems associated with navigating in the roadway.

9. A system, comprising: a memory; and at least one processor coupled to the memory and configured to:
identify a condition in a roadway associated with an operation of one or more autonomous vehicles (AVs) that may be further optimized to improve performance of the one or more AVs, identify the condition in the roadway further includes:
mine a plurality of roadway images from one or more data sources for factors relating to or matching a reoccurring situation, as the condition, in the roadway; and
associate the plurality of roadway images with one or more other roadways to traverse based on location and time; and
generate one or more condition capture instructions to communicate to the one or more AVs, one or more parameters of a storage request in one or more roadways predicted to exhibit the condition in the roadway,
wherein, when at least one condition capture instruction in the one or more condition capture instructions are received by an AV computing system in at least one of the one or more AVs, the at least one condition capture instruction is configured to cause the at least one AV of the one or more AVs to collect condition information in the roadway at a time when the condition is predicted to be present in the roadway,
control at least one of the one or more AVs based on the one or more condition capture instructions.

10. The system of claim 9, wherein the at least one processor is further configured to:
check the confidence interval of a specific metric associated with the condition in the roadway to determine whether each of the one or more roadways is in a specific target range;
determine a confidence interval of a specific metric associated with the condition in the roadway is in a specific target range for at least one roadway of the one or more roadways; and
in response to determining the confidence interval is within a specific target range for the at least one roadway,
transmit, to the at least one AV of the one or more AVs, an instruction in the one or more condition capture instructions to collect condition information in the at least one roadway.

11. The system of claim 9, wherein the condition in the roadway is determined to be present by determining target information based on one or more objects identified in information previously collected which also include the condition in the roadway, and the target information includes parameters for at least one of a place, a location, or a time, for controlling logging information when the condition in the roadway is predicted to be present.

12. The system of claim 9, wherein the at least one processor is further configured to:
determine a time or a location when a first AV of the one or more A Vs may traverse a roadway having an observable condition;
determine a time or a location when a second AV of the one or more AVs may traverse a roadway having an observable condition related to at least one of a place, a location, or a time, that should be logged;
match roadway information from one or more sources of information that are related to at least one of the condition in the roadway; and
send an instruction to the one or more AVs to cause the first AV and the second AV to log information of the roadway in an environment surrounding each respective AV for a specified location at the time when the condition is predicted to be present in the roadway.

13. The system of claim 12, wherein the at least one processor is configured to:
  determine that a threshold number of AVs have previously collected information about the specified place, location, or time; and
  send an instruction to a fleet of AVs to cause each of the one or more AVs of the fleet of AVs to stop logging information for the specified place, location, or time.

14. The system of claim 9, wherein the condition in the roadway includes a naturally occurring situation in and around a roadway that may affect one or more operations of the at least one AV of the one or more AVs, execution, movement, or action, and
  wherein at least one signal, factor, or object serves as a proxy for the naturally occurring condition.

15. The system of claim 9, wherein the processor is further configured to perform at least one of: obtaining a specified number of images, obtaining a number of images to perform a specific process, or obtaining a number of images to update an inference engine.

16. The system of claim 9, wherein the processor is further configured to eliminate or decrease processing for logging, review, or analysis of objects,
  wherein logging comprises eliminating extra logging by logging based only on AV mining, comprising: collecting images that improve perception of autonomous systems or contribute to solving problems associated with navigating in the roadway.

17. A non-transitory computer-readable medium having instructions stored thereon that, when executed by at least one computing device, cause the at least one computing device to:
  identify a condition in a roadway associated with an operation of one or more autonomous vehicles (AVs) that may be further optimized to improve performance of the one or more AVs, identify the condition in the roadway further includes:
    mine a plurality of roadway images from one or more data sources for factors relating to (or matching) a reoccurring situation in the roadway; and
    associate the plurality of roadway images with one or more other roadways to traverse based on location and time; and
  generate one or more condition capture instructions to communicate to the one or more AVs, one or more parameters of a storage request in one or more roadways predicted to exhibit the condition in the roadway;
  wherein, when at least one condition capture instruction in the one or more condition capture instructions are received by an AV computing system in at least one of the one or more AVs, the at least one condition capture instruction is configured to cause the at least one AV of the one or more AVs to collect condition information in the roadway at a time when the condition is predicted to be present in the roadway,
  control at least one of the one or more AVs based on the one or more condition capture instructions.

18. The non-transitory computer-readable medium of claim 17, having further instructions stored thereon that, when executed by at least one computing device, cause the at least one computing device to:
  check the confidence interval of a specific metric associated with the condition in the roadway to determine whether each of the one or more roadways is in a specific target range;
  determine a confidence interval of a specific metric associated with the condition in the roadway is in a specific target range for at least one roadway of the one or more roadways; and
  in response to determining the confidence interval is within a specific target range for the at least one roadway,
  transmit, to the AV, an instruction in the one or more condition capture instructions to collect condition information in the at least one roadway.

* * * * *